United States Patent
Hu et al.

(10) Patent No.: US 10,885,801 B2
(45) Date of Patent: Jan. 5, 2021

(54) VIRTUALIZED TANGIBLE PROGRAMMING

(71) Applicant: Tangible Play, Inc., Palo Alto, CA (US)

(72) Inventors: Felix Hu, Palo Alto, CA (US); Vivardhan Kanoria, Berkeley, CA (US); Arnaud Brejeon, Yorba Linda, CA (US)

(73) Assignee: Tangible Play, Inc., Palo Alto, CA (US)

( * ) Notice: Subject to any disclaimer, the term of this patent is extended or adjusted under 35 U.S.C. 154(b) by 249 days.

(21) Appl. No.: 15/604,620

(22) Filed: May 24, 2017

(65) Prior Publication Data

US 2017/0344127 A1     Nov. 30, 2017

Related U.S. Application Data

(60) Provisional application No. 62/341,041, filed on May 24, 2016.

(51) Int. Cl.
| | |
|---|---|
| *G09B 5/02* | (2006.01) |
| *G06K 9/00* | (2006.01) |
| *G09B 19/00* | (2006.01) |
| *A63F 13/98* | (2014.01) |
| *G05B 19/042* | (2006.01) |
| *A63F 13/63* | (2014.01) |
| *G06F 3/0354* | (2013.01) |

(Continued)

(52) U.S. Cl.
CPC ............... *G09B 5/02* (2013.01); *A63F 13/63* (2014.09); *A63F 13/655* (2014.09); *A63F 13/98* (2014.09); *G05B 19/0426* (2013.01); *G06F 3/002* (2013.01); *G06F 3/0354* (2013.01); *G06F 3/0425* (2013.01); *G06F 8/34* (2013.01); *G06K 9/00744* (2013.01); *G06K 9/4604* (2013.01); *G09B 1/325* (2013.01); *G09B 19/0053* (2013.01); *G05B 2219/23045* (2013.01); *G05B 2219/23157* (2013.01)

(58) Field of Classification Search
None
See application file for complete search history.

(56) References Cited

U.S. PATENT DOCUMENTS

| | | | |
|---|---|---|---|
| 6,175,954 B1 * | 1/2001 | Nelson | G06F 8/34 717/105 |
| 9,953,546 B1 * | 4/2018 | Goldstein | G09B 19/0053 |

(Continued)

OTHER PUBLICATIONS

Hu et al., "Strawbies: Explorations in Tangible Programming," Proceedings of the 14th International Conference on Interaction Design and Children, 2015 (5 pages).

Primary Examiner — Amare Mengistu
Assistant Examiner — Sarvesh J Nadkarni
(74) Attorney, Agent, or Firm — Patent Law Works LLP

(57) ABSTRACT

Systems and methods for virtualized tangible programming are described. In an example implementation, a method includes detecting an object in image data, performing a comparison between the object and a predefined set of object definitions, recognizing the object as a visually quantified object or a visually unquantified object based on the comparison, processing a command region and a quantifier region for the visually quantified object and identifying a corresponding command, and executing a set of commands for the object.

24 Claims, 31 Drawing Sheets

(51) Int. Cl.
    *G06F 3/00*     (2006.01)
    *A63F 13/655*     (2014.01)
    *G06F 8/34*     (2018.01)
    *G06F 3/042*     (2006.01)
    *G09B 1/32*     (2006.01)
    *G06K 9/46*     (2006.01)

(56) References Cited

U.S. PATENT DOCUMENTS

| | | | | |
|---|---|---|---|---|
| 2011/0167404 | A1* | 7/2011 | Liu | G06F 8/33 717/106 |
| 2013/0217491 | A1* | 8/2013 | Hilbert | A63F 13/00 463/31 |
| 2014/0297035 | A1* | 10/2014 | Bers | G09B 1/325 700/257 |
| 2015/0095883 | A1* | 4/2015 | Shi | G06F 11/362 717/109 |
| 2017/0004730 | A1* | 1/2017 | Kim | G09B 5/00 |
| 2018/0095732 | A1* | 4/2018 | Hong | G06F 3/0488 |
| 2018/0342172 | A1* | 11/2018 | Rabyking | G09B 19/0053 |
| 2019/0095178 | A1* | 3/2019 | Chun | G09B 19/0053 |

\* cited by examiner

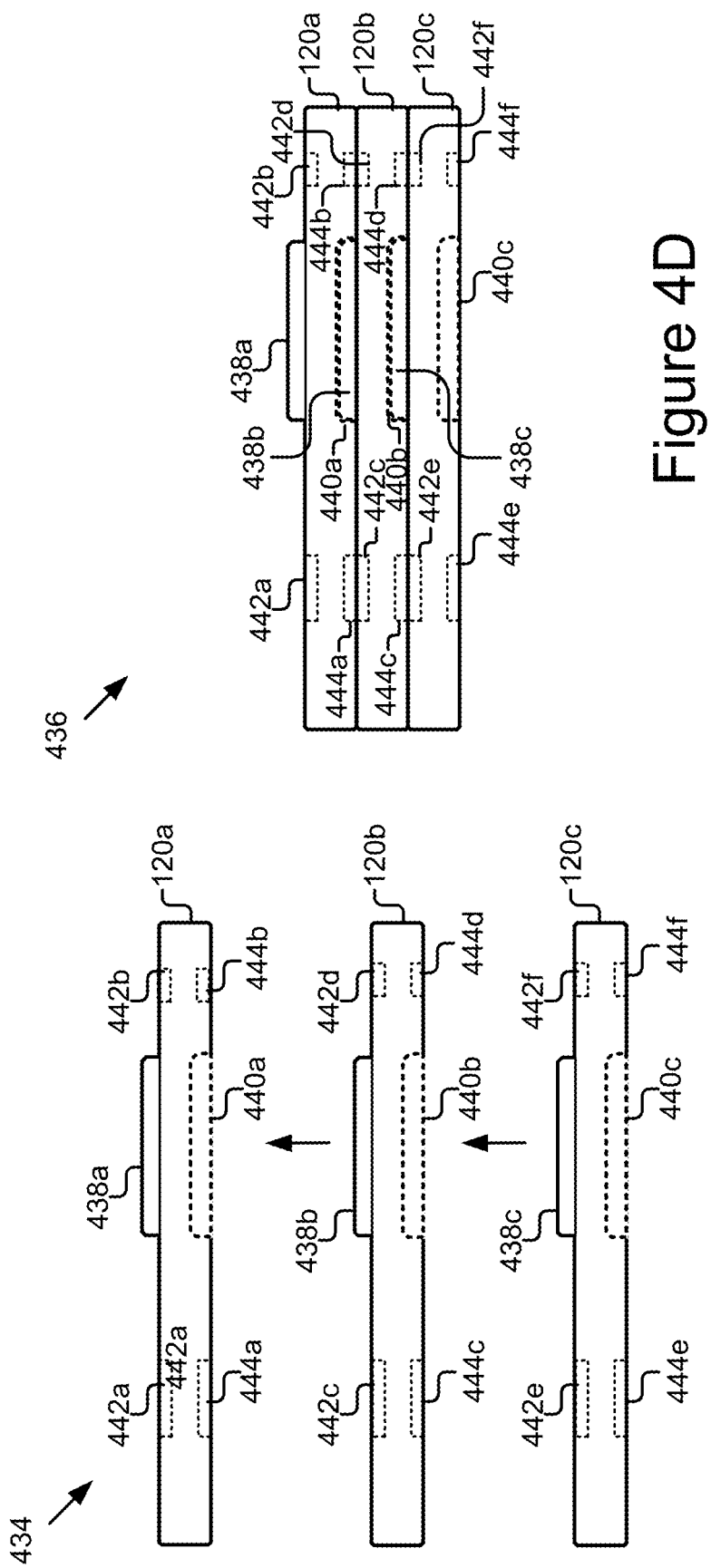

VIRTUALIZED TANGIBLE PROGRAMMING

CROSS-REFERENCE TO RELATED APPLICATION

This application claims the benefit under 35 U.S.C. § 119(e) of U.S. Provisional Application No. 62/341,041, entitled "Virtualized Tangible Programming", filed on May 24, 2016, the entire contents of which are incorporated herein by reference.

BACKGROUND

The present disclosure relates to virtualized tangible programming.

A tangible user interface is a physical environment that a user can physically interact with to manipulate digital information. While tangible user interfaces have opened up a new range of possibilities for interacting with digital information, significant challenges remain when implementing such an interface. For instance, existing tangible user interfaces generally require expensive, high-quality sensors to digitize user interactions with this environment, which results in systems incorporating these tangible user interfaces being too expensive for most consumers. In addition, these existing systems are often difficult to setup and use, which has led to limited customer use and adoption.

Additionally, there is growing momentum for supporting computational literacy activities throughout K12 education, starting at the earliest grade levels. However, one of the greatest challenges facing the adoption of computational literacy programs, such as developmentally appropriate technology in classrooms, is that stakeholders (e.g., teachers) must feel comfortable and confident with the materials. This includes making sure that technology is accessible to and understandable by stakeholders. The technology should also meet other objectives, such as align with a pedagogical philosophy, such as one of early childhood educators that emphasizes rich sensory-motor experiences, open-ended exploration, and social interaction.

However, while some solutions have been developed to teach computational literacy (e.g., programming to children), these solutions have had limited success, often due to their complexity or cost. For instance, some existing tangible programming systems that rely on computer vision require use of dedicated hardware (e.g., an overhead camera fixture, an interactive surface with built-in camera hardware, or other bulky, complicated, cumbersome, and/or expensive specialized equipment). These solutions often require specialized training to setup, configure, and customize the experience to the abilities of an (potentially diverse) audience, which deters adoption.

The technology described herein addresses the deficiencies of other solutions by providing a flexible, portable, highly-responsive, and practical, tangible programming platform.

SUMMARY

According to one innovative aspect of the subject matter in this disclosure, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including: detecting objects in image data; performing comparisons between each of the objects and a predefined set of object definitions; recognizing each of the objects as a visually quantified object or a visually unquantified object based on the comparisons; for each of the objects that is recognized as a visually quantified object, processing a command region and a quantifier region from the object, identifying a corresponding command for the object based on a particular visual attribute of the command region, and identifying a quantifier for the command based on a particular visual attribute of the quantifier region; for each of the objects that is recognized as a visually unquantified object, identifying a corresponding command for the object based on a particular visual attribute of the object; and executing, using a computer processor, a set of commands including the corresponding command for each of the objects detected in the image data. Other embodiments of this aspect include corresponding computer systems, apparatus, and computer programs recorded on one or more computer storage devices, each configured to perform the actions of the methods.

Implementations may include one or more of the following features. The computer-implemented method further including: displaying a virtual environment in a user interface, the virtual environment including a target virtual object; and capturing the image data, which depicts a sequence of physical interface objects arranged in a physical environment, where detecting the objects in the image data includes detecting representations of the physical interface objects forming the sequence. The computer-implemented method further including: displaying a virtual environment in a user interface, the virtual environment including a target virtual object; visually manipulating the target virtual object in the virtual environment responsive to executing the set of commands. The computer-implemented method where executing the set of commands includes. The computer-implemented method may also include building an instruction set including the corresponding command for each of the objects detected in the image data. The computer-implemented method may also include executing the instruction set using the computer processor. The computer-implemented method where building the instruction set includes. The computer-implemented method may also include generating one or more clusters of the objects based on relative positions and relative orientations of the objects. The computer-implemented method may also include determining a sequence for the commands of the instruction set based on the one or more clusters. The computer-implemented method further including: determining that a candidate object is missing from a candidate location in the one or more clusters based on the relative positions and relative orientations of the objects; and injecting, into the instruction set, a command corresponding to the candidate object at a position corresponding to the candidate location. The computer-implemented method where, for each of the objects that is recognized as a visually unquantified object, identifying the corresponding command for the object based on the particular visual attribute of the object includes: identifying an end object for a sequence of the objects detected from the image data; and determining a physical state of the end object from the image data, where executing the set of commands includes determining to execute based on the physical state of the end object detected from the image data. The computer-implemented method where a physical object associated with the end object depicted by the image data includes a user-pressable button that changes an aspect of the physical object from a first state to a second state in which the user-pressable button is in a pressed state that is visually perceptible, the image data depicts the end object in the second state, and determining the physical state of the end object includes using blob detection and machine learning to determine the physical state of the end object is a pressed state. The computer-implemented method where the end object includes a physical state including one of a pressed state, an unpressed state, a semi-pressed state, and a rubbish state that is indeterminable. The computer-implemented method where recognizing each of the objects as a visually quantified object includes performing blob detection to detect a directional region of at least one object of the objects as including a directional indicator, and processing the command region and the quantifier region includes dividing the object into the action region and the quantifier region based on the directional region. The computer-implemented method where, the directional indicator is pointed one or more of up, down, left, and right. The computer-implemented method where, the particular visual attribute of the command region includes a predetermined color or graphic, and the particular visual attribute of the quantifier region includes a number. The computer-implemented method where executing the instruction set further includes: displaying a virtual environment in a user interface, the virtual environment including a target virtual object; determining a path of the target virtual object through a portion of the virtual environment based on the instruction set; and displaying a path projection of the path to a user. The computer-implemented method where the command region includes an action region and a direction region and where identifying the quantified command based on the visual attributes of the command region further includes: identifying an action command based on visual attributes of the action region; and identifying a direction command based on visual attributes of the direction region. The computer-implemented method where the specific command includes one of a jump command, a move command, and an action command. The computer-implemented method where executing the specific command based on the quantifier further includes: repeating for an amount of the quantifier, the executing of one of the jump command, the move command, and the action command. The computer-implemented method where executing the specific command based on the quantifier to manipulate the virtual object includes presenting the virtual object moving through a virtual environment based on the specific command. The computer-implemented method further including: generating a new virtual object for presentation on the display device based on the specific command. The physical interface object further including: a pressable button situated on the top surface, where the pressable button may be interacted with to transition the pressable button between states when the pressable button is depressed. The physical interface object where the visual aspects are configured to alter their appearance in response to a pressable button being depressed. The physical interface object where the compatible physical interface object includes a second top surface including one or more second visual aspects. The physical interface object further including: a dial coupled to the top surface, the dial including one or more visual directional indicator aspects. The physical interface object where the dial is a rotatable dial that can be rotated horizontally to the position of the top surface. The physical interface object where the physical interface object includes a command region and the compatible physical interface object includes a quantifier region such that when the physical interface object is coupled with the compatible physical interface object a visually quantified object is formed. Implementations of the described techniques may include hardware, a method or process, or computer software on a computer-accessible medium.

One general aspect includes the computer-implemented method where the candidate object is one of an end object, an event object, and an action object missing from the image data. Other embodiments of this aspect include corresponding computer systems, apparatus, and computer programs recorded on one or more computer storage devices, each configured to perform the actions of the methods.

One general aspect includes a computer-implemented method including: detecting an object from image data; recognizing the object as a numerically quantified object based on a predetermined visual characteristic; processing the recognized object into a command region and a quantifier region; identifying a specific command for manipulating, based on a visual attribute of the command region, a virtual object rendered for display in a virtual environment displayed on a display of the competing device; identifying a quantifier for the specific command based on a visual attribute of the quantifier region; and executing, using a processor of the computing device, the specific command based on the quantifier to manipulate the virtual object. Other embodiments of this aspect include corresponding computer systems, apparatus, and computer programs recorded on one or more computer storage devices, each configured to perform the actions of the methods.

Implementations may include one or more of the following features. The computer-implemented method where the specific command includes one of a jump command, a move command, and an action command. The computer-implemented method where executing the specific command based on the quantifier further includes: repeating for an amount of the quantifier, the executing of one of the jump command, the move command, and the action command. The computer-implemented method where executing the specific command based on the quantifier to manipulate the virtual object includes presenting the virtual object moving through a virtual environment based on the specific command. The computer-implemented method further including: generating a new virtual object for presentation on the display device based on the specific command. The physical interface object further including: a pressable button situated on the top surface, where the pressable button may be interacted with to transition the pressable button between states when the pressable button is depressed. The physical interface object where the visual aspects are configured to alter their appearance in response to a pressable button being depressed. The physical interface object where the compatible physical interface object includes a second top surface including one or more second visual aspects. The physical interface object further including: a dial coupled to the top surface, the dial including one or more visual directional indicator aspects. The physical interface object where the dial is a rotatable dial that can be rotated horizontally to the position of the top surface. The physical interface object where the physical interface object includes a command region and the compatible physical interface object includes a quantifier region such that when the physical interface object is coupled with the compatible physical interface object a visually quantified object is formed. Implementations of the described techniques may include hardware, a method or process, or computer software on a computer-accessible medium.

One general aspect includes a computer-implemented method including: presenting a user interface including a virtual environment and a target object, determining an initial state of the target object in the virtual environment of the user interface, capturing an image of a physical activity surface, processing the image to detect two or more physical interface objects in a specific orientation, comparing the physical interface objects in the specific orientation to a predefined set of instructions, determining a command represented by the physical interface objects in the specific orientation based on the comparison, determining a path through the virtual environment for the target object using the command, and displaying a path projection in the user interface along the path for presentation to a user. Other embodiments of this aspect include corresponding computer systems, apparatus, and computer programs recorded on one or more computer storage devices, each configured to perform the actions of the methods.

One general aspect includes a computer-implemented method including: receiving, from a video capture device, a video stream that includes a physical activity scene of a physical activity surface, proximate to a display device, and one or more physical interface objects placed on the physical activity scene and physically interactable with by a user; processing, using one or more computing devices, the video stream to detect the one or more physical interface objects included in the physical activity scene; recognizing each of the physical interface objects as a visually quantified object or a visually unquantified object based on the comparisons; for each of the physical interface objects that is recognized as a visually quantified object, processing a command region and a quantifier region from the object, identifying a corresponding command for the physical interface object based on a particular visual attribute of the command region, and identifying a quantifier for the command based on a particular visual attribute of the quantifier region; for each of the physical interface objects that is recognized as a visually unquantified object, identifying a corresponding command for the physical interface object based on a particular visual attribute of the object; and executing, using the one or more computing devices, a set of commands including the corresponding command for each of the objects detected in the image data to present virtual information on the display device. Other embodiments of this aspect include corresponding computer systems, apparatus, and computer programs recorded on one or more computer storage devices, each configured to perform the actions of the methods.

One general aspect includes a visual tangible programming system including: a video capture device coupled for communication with a computing device, the video capture device being adapted to capture a video stream that includes a physical activity scene adjacent to the computing device; a detector, coupled to the computing device, the detector being adapted to detect within the video stream a sequence of physical interface objects in the physical activity scene; a processor of the computing device, the processor being adapted to compare the sequence of physical interface objects to a predefined set of object definitions and recognize visually quantified objects and visually unquantified objects based on the comparison, and execute a set of commands based the visually quantified objects and visually unquantified objects; and a display coupled to the computing device, the display being adapted to display an interface that includes a virtual scene and update the virtual scene based on the executed set of commands. Other embodiments of this aspect include corresponding computer systems, apparatus, and computer programs recorded on one or more computer storage devices, each configured to perform the actions of the methods.

One general aspect includes a physical interface object for constructing a computer program in a physical space including: a housing including a top surface, a lower side surface, an upper side surface, a left side surface, a right side surface, and a bottom surface; the top surface including one or more visual aspects; one or more of the lower side surface, the upper side surface, the left side surface, and the right side surface including one or more magnetic fasteners configured to couple to a corresponding side surface of a compatible physical interface object; lower side surface, the upper side surface, the left side surface, and the right side surface including an alignment mechanism for coupling to a compatible alignment mechanism of a compatible physical interface object. Other embodiments of this aspect include corresponding computer systems, apparatus, and computer programs recorded on one or more computer storage devices, each configured to perform the actions of the methods.

Implementations may include one or more of the following features. The physical interface object further including: a pressable button situated on the top surface, where the pressable button may be interacted with to transition the pressable button between states when the pressable button is depressed. The physical interface object where the visual aspects are configured to alter their appearance in response to a pressable button being depressed. The physical interface object where the compatible physical interface object includes a second top surface including one or more second visual aspects. The physical interface object further including: a dial coupled to the top surface, the dial including one or more visual directional indicator aspects. The physical interface object where the dial is a rotatable dial that can be rotated horizontally to the position of the top surface. The physical interface object where the physical interface object includes a command region and the compatible physical interface object includes a quantifier region such that when the physical interface object is coupled with the compatible physical interface object a visually quantified object is formed. Implementations of the described techniques may include hardware, a method or process, or computer software on a computer-accessible medium.

Other implementations of one or more of these aspects and other aspects described in this document include corresponding systems, apparatus, and computer programs, configured to perform the actions of the methods, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 4A-4D are graphical representations illustrating example physical interface objects.

DETAILED DESCRIPTION

The technology described herein provides a platform for a real time, tangible programming environment. The programming environment is intuitive and allows users to understand how to construct programs without prior training. For example, a user may create a sequence of physical interface objects and cause a virtual scene to change based on executed commands that correspond to the sequence of physical interface objects.

Figure 1:
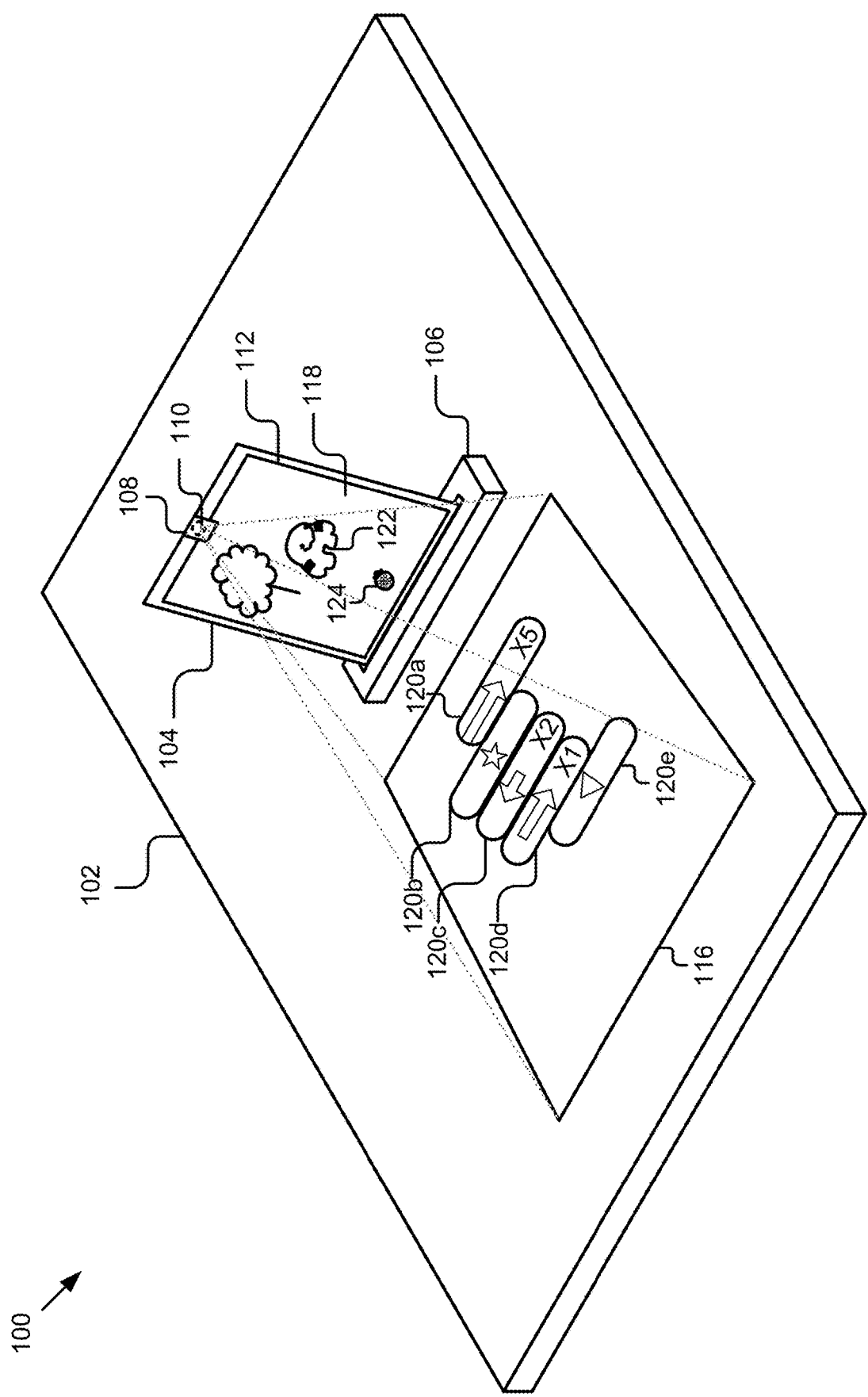
FIG. 1 is a graphical representation illustrating an example configuration for virtualized tangible programming.

FIG. 1 is a graphical representation illustrating an example configuration 100 of a system for virtualized tangible programming. The configuration 100 may be used for various activities in the physical activity scene 116. As depicted, the configuration 100 includes, in part, a tangible, physical activity surface 102 on which physical interface object(s) 120 may be placed (e.g., drawn, created, molded, built, projected, etc.) and a computing device 104 that is equipped or otherwise coupled to a video capture device 110 configured to capture video of the activity surface 102. The physical interface object(s) 120 may be arranged in the physical activity scene 116 in a collection, which may form a computer program (e.g., a sequence of programming instructions/commands). The various components that make up the physical interface object(s) 120 may be coupled (e.g., mated, aligned, slid in and out) together in different combinations and/or physically manipulated (e.g., rotated, pressed, switched, etc.). For example, verb tiles may be joined with other verb tiles, unit tiles and/or adverb tiles may be joined with verb tiles (e.g., like puzzle pieces), directional dials may be rotated, etc. The computing device 104 includes novel software and/or hardware capable of executing commands to manipulate a target virtual object 122 based on the physical interface object(s) 120.

While the activity surface 102 is depicted as substantially horizontal in FIG. 1, it should be understood that the activity surface 102 can be vertical or positioned at any other angle suitable to the user for interaction. The activity surface 102 can have any color, pattern, texture, and topography. For instance, the activity surface 102 can be substantially flat or be disjointed/discontinuous in nature. Non-limiting examples of an activity surface 102 include a table, desk, counter, ground, a wall, a whiteboard, a chalkboard, a customized surface, etc. The activity surface 102 may additionally or alternatively include a medium on which the user may render physical interface object(s) 120, such as paper, canvas, fabric, clay, foam, or other suitable medium.

In some implementations, the activity surface 102 may be preconfigured for certain activities. As depicted in FIG. 1, an example configuration may include an activity surface 102 that includes a physical activity scene 116, such as a whiteboard or drawing board. The physical activity scene 116 may be integrated with the stand 106 or may be distinct from the stand 106 but placeable adjacent to the stand 106. The physical activity scene 116 can indicate to the user the boundaries of the activity surface 102 that is within the field of view of the video capture device 110. In some implementations, the physical activity scene 116 may be a board, such as a chalkboard or whiteboard, separate from the activity surface 102.

In some instances, the size of the interactive area on the physical activity scene 116 may be bounded by the field of view of the video capture device 110 and can be adapted by an adapter 108 and/or by adjusting the position of the video capture device 110. In additional examples, the physical activity scene 116 may be a light projection (e.g., pattern, context, shapes, etc.) projected onto the activity surface 102.

The computing device 104 included in the example configuration 100 may be situated on the physical activity surface 102 or otherwise proximate to the physical activity surface 102. The computing device 104 can provide the user(s) with a virtual portal for viewing a virtual scene 118. For example, the computing device 104 may be placed on a table in front of a user so the user can easily see the computing device 104 while interacting with physical interface object(s) 120 on the physical activity surface 102. Example computing devices 104 may include, but are not limited to, mobile phones (e.g., feature phones, smart phones, etc.), tablets, laptops, desktops, netbooks, TVs, set-top boxes, media streaming devices, portable media players, navigation devices, personal digital assistants, etc.

The computing device 104 includes or is otherwise coupled (e.g., via a wireless or wired connection) to a video capture device 110 (also referred to herein as a camera) for capturing a video stream of the activity surface 102. As depicted in FIG. 1 the video capture device 110 may be a front-facing camera that is equipped with an adapter 108 that adapts the field of view of the camera 110 to include, at least in part, the activity surface 102. For clarity, the physical activity scene 116 of the activity surface 102 captured by the video capture device 110 is also interchangeably referred to herein as the activity surface or the activity scene in some implementations.

As depicted in FIG. 1, the computing device 104 and/or the video capture device 110 may be positioned and/or supported by a stand 106. For instance, the stand 106 may position the display 112 of the video capture device 110 in a position that is optimal for viewing and interaction by the user who is simultaneously interacting with the physical environment (physical activity scene 116). The stand 106 may be configured to rest on the activity surface 102 and receive and sturdily hold the computing device 104 so the computing device 104 remains still during use.

In some implementations, the adapter 108 adapts a video capture device 110 (e.g., front-facing, rear-facing camera) of the computing device 104 to capture substantially only the physical activity scene 116, although numerous further implementations are also possible and contemplated. For instance, the camera adapter 108 can split the field of view of the front-facing camera into two scenes. In this example with two scenes, the video capture device 110 captures a physical activity scene 116 that includes a portion of the activity surface 102 and is able to capture physical interface object(s) 120 in either portion of the physical activity scene 116. In another example, the camera adapter 108 can redirect a rear-facing camera of the computing device (not shown) toward a front-side of the computing device 104 to capture the physical activity scene 116 of the activity surface 102 located in front of the computing device 104. In some implementations, the adapter 108 can define one or more sides of the scene being captured (e.g., top, left, right, with bottom open).

The adapter 108 and stand 106 for a computing device 104 may include a slot for retaining (e.g., receiving, securing, gripping, etc.) an edge of the computing device 104 to cover at least a portion of the camera 110. The adapter 108 may include at least one optical element (e.g., a mirror) to direct the field of view of the camera 110 toward the activity surface 102. The computing device 104 may be placed in and received by a compatibly sized slot formed in a top side of the stand 106. The slot may extend at least partially downward into a main body of the stand 106 at an angle so that when the computing device 104 is secured in the slot, it is angled back for convenient viewing and utilization by its user or users. The stand 106 may include a channel formed perpendicular to and intersecting with the slot. The channel may be configured to receive and secure the adapter 108 when not in use. For example, the adapter 108 may have a tapered shape that is compatible with and configured to be easily placeable in the channel of the stand 106. In some instances, the channel may magnetically secure the adapter 108 in place to prevent the adapter 108 from being easily jarred out of the channel. The stand 106 may be elongated along a horizontal axis to prevent the computing device 104 from tipping over when resting on a substantially horizontal activity surface (e.g., a table). The stand 106 may include channeling for a cable that plugs into the computing device 104. The cable may be configured to provide power to the computing device 104 and/or may serve as a communication link to other computing devices, such as a laptop or other personal computer.

In some implementations, the adapter 108 may include one or more optical elements, such as mirrors and/or lenses, to adapt the standard field of view of the video capture device 110. For instance, the adapter 108 may include one or more mirrors and lenses to redirect and/or modify the light being reflected from activity surface 102 into the video capture device 110. As an example, the adapter 108 may include a mirror angled to redirect the light reflected from the activity surface 102 in front of the computing device 104 into a front-facing camera of the computing device 104. As a further example, many wireless handheld devices include a front-facing camera with a fixed line of sight with respect to the display 112 including a virtual scene 118. The adapter 108 can be detachably connected to the device over the camera 110 to augment the line of sight of the camera 110 so it can capture the activity surface 102 (e.g., surface of a table). The mirrors and/or lenses in some implementations can be polished or laser quality glass. In other examples, the mirrors and/or lenses may include a first surface that is a reflective element. The first surface can be a coating/thin film capable of redirecting light without having to pass through the glass of a mirror and/or lens. In an alternative example, a first surface of the mirrors and/or lenses may be a coating/thin film and a second surface may be a reflective element. In this example, the lights passes through the coating twice, however since the coating is extremely thin relative to the glass, the distortive effect is reduced in comparison to a conventional mirror. This reduces the distortive effect of a conventional mirror in a cost effective way.

In another example, the adapter 108 may include a series of optical elements (e.g., mirrors) that wrap light reflected off of the activity surface 102 located in front of the computing device 104 into a rear-facing camera of the computing device 104 so it can be captured. The adapter 108 could also adapt a portion of the field of view of the video capture device 110 (e.g., the front-facing camera) and leave a remaining portion of the field of view unaltered so that multiple scenes may be captured by the video capture device 110 as shown in FIG. 1. The adapter 108 could also include optical element(s) that are configured to provide different effects, such as enabling the video capture device 110 to capture a greater portion of the activity surface 102. For example, the adapter 108 may include a convex mirror that provides a fisheye effect to capture a larger portion of the activity surface 102 than would otherwise be capturable by a standard configuration of the video capture device 110.

The video capture device 110 could, in some implementations, be an independent unit that is distinct from the computing device 104 and may be positionable to capture the activity surface 102 or may be adapted by the adapter 108 to capture the activity surface 102 as discussed above. In these implementations, the video capture device 110 may be communicatively coupled via a wired or wireless connection to the computing device 104 to provide it with the video stream being captured.

The physical interface object(s) 120 in some implementations may be tangible objects that a user may interact with in the physical activity scene 116. For example, the physical interface object(s) 120 in some implementations may be programming blocks that depict various programming actions and functions. A user may arrange a sequence of the programming blocks representing different actions and functions on the physical activity scene 116 and the computing device 104 may process the sequence to determine a series of commands to execute in the virtual scene 118.

The virtual scene 118 in some implementations may be a graphical interface displayed on a display of the computing device 104. The virtual scene 118 may be setup to display prompts and actions to a user to assist in organizing the physical interface object(s) 120. For example, in some implementations, the virtual scene may include a target virtual object 122, depicted in FIG. 1 as an animated character. The user may create a series of commands using the physical interface object(s) 120 to control various actions of the target virtual object 122, such as making the target virtual object 122 move around the virtual scene 118, interact with an additional virtual object 124, perform a repeated action, etc.

Figure 2:
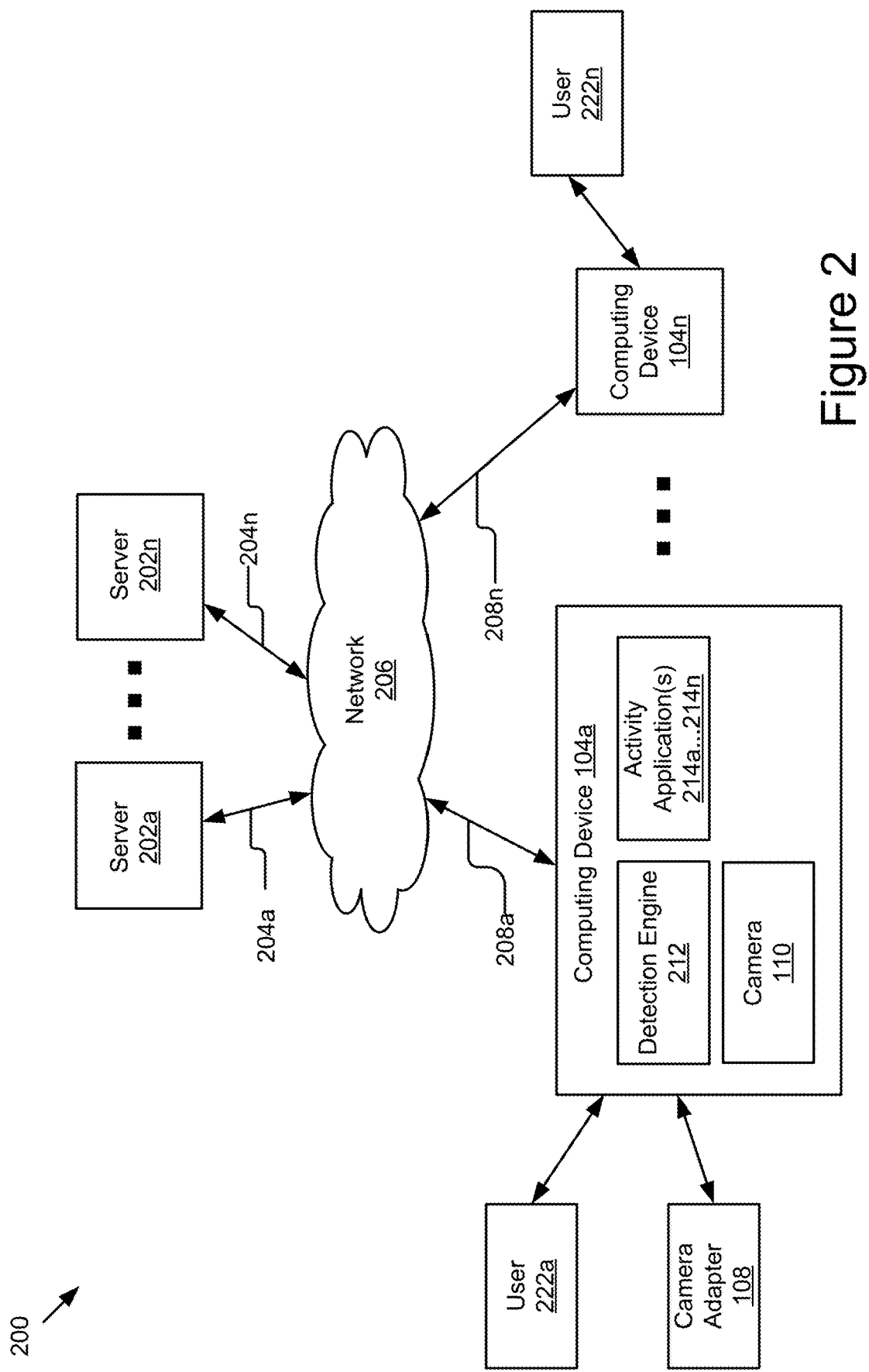
FIG. 2 is a block diagram illustrating an example computer system for virtualized tangible programming.

FIG. 2 is a block diagram illustrating an example computer system 200 for virtualized tangible programming. The illustrated system 200 includes computing devices 104a . . . 104n (also referred to individually and collectively as 104) and servers 202a . . . 202n (also referred to individually and collectively as 202), which are communicatively coupled via a network 206 for interaction with one another. For example, the computing devices 104a . . . 104n may be respectively coupled to the network 206 via signal lines 208a . . . 208n and may be accessed by users 222a . . . 222n (also referred to individually and collectively as 222). The servers 202a . . . 202n may be coupled to the network 206 via signal lines 204a . . . 204n, respectively. The use of the nomenclature "a" and "n" in the reference numbers indicates that any number of those elements having that nomenclature may be included in the system 200.

The network 206 may include any number of networks and/or network types. For example, the network 206 may include, but is not limited to, one or more local area networks (LANs), wide area networks (WANs) (e.g., the Internet), virtual private networks (VPNs), mobile (cellular)

networks, wireless wide area network (WWANs), WiMAX® networks, Bluetooth® communication networks, peer-to-peer networks, other interconnected data paths across which multiple devices may communicate, various combinations thereof, etc.

The computing devices 104a . . . 104n (also referred to individually and collectively as 104) are computing devices having data processing and communication capabilities. For instance, a computing device 104 may include a processor (e.g., virtual, physical, etc.), a memory, a power source, a network interface, and/or other software and/or hardware components, such as front and/or rear facing cameras, display, graphics processor, wireless transceivers, keyboard, camera, sensors, firmware, operating systems, drivers, various physical connection interfaces (e.g., USB, HDMI, etc.). The computing devices 104a . . . 104n may couple to and communicate with one another and the other entities of the system 200 via the network 206 using a wireless and/or wired connection. While two or more computing devices 104 are depicted in FIG. 2, the system 200 may include any number of computing devices 104. In addition, the computing devices 104a . . . 104n may be the same or different types of computing devices.

As depicted in FIG. 2, one or more of the computing devices 104a . . . 104n may include a camera 110, a detection engine 212, and activity application(s) 214. One or more of the computing devices 104 and/or cameras 110 may also be equipped with an adapter 108 as discussed elsewhere herein. The detection engine 212 is capable of detecting and/or recognizing physical interface object(s) 120 located in/on the physical activity scene 116 (e.g., on the activity surface 102 within field of view of camera 110). The detection engine 212 can detect the position and orientation of the physical interface object(s) 120 in physical space, detect how the physical interface object(s) 120 are being manipulated by the user 222, and cooperate with the activity application(s) 214 to provide users 222 with a rich virtual experience by executing commands in the virtual scene 118 based on the physical interface object(s) 120.

In some implementations, the detection engine 212 processes video captured by a camera 110 to detect physical interface object(s) 120. The activity application(s) 214 are capable of executing a series of commands in the virtual scene 118 based on the detected physical interface object(s) 120. Additional structure and functionality of the computing devices 104 are described in further detail below with reference to at least FIG. 3.

The servers 202 may each include one or more computing devices having data processing, storing, and communication capabilities. For example, the servers 202 may include one or more hardware servers, server arrays, storage devices and/or systems, etc., and/or may be centralized or distributed/cloud-based. In some implementations, the servers 202 may include one or more virtual servers, which operate in a host server environment and access the physical hardware of the host server including, for example, a processor, memory, storage, network interfaces, etc., via an abstraction layer (e.g., a virtual machine manager).

The servers 202 may include software applications operable by one or more computer processors of the servers 202 to provide various computing functionalities, services, and/or resources, and to send data to and receive data from the computing devices 104. For example, the software applications may provide functionality for internet searching; social networking; web-based email; blogging; micro-blogging; photo management; video, music and multimedia hosting, distribution, and sharing; business services; news and media distribution; user account management; or any combination of the foregoing services. It should be understood that the servers 202 are not limited to providing the above-noted services and may include other network-accessible services.

It should be understood that the system 200 illustrated in FIG. 2 is provided by way of example, and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 200 may be integrated into a single computing device or system or additional computing devices or systems, etc.

Figure 3:
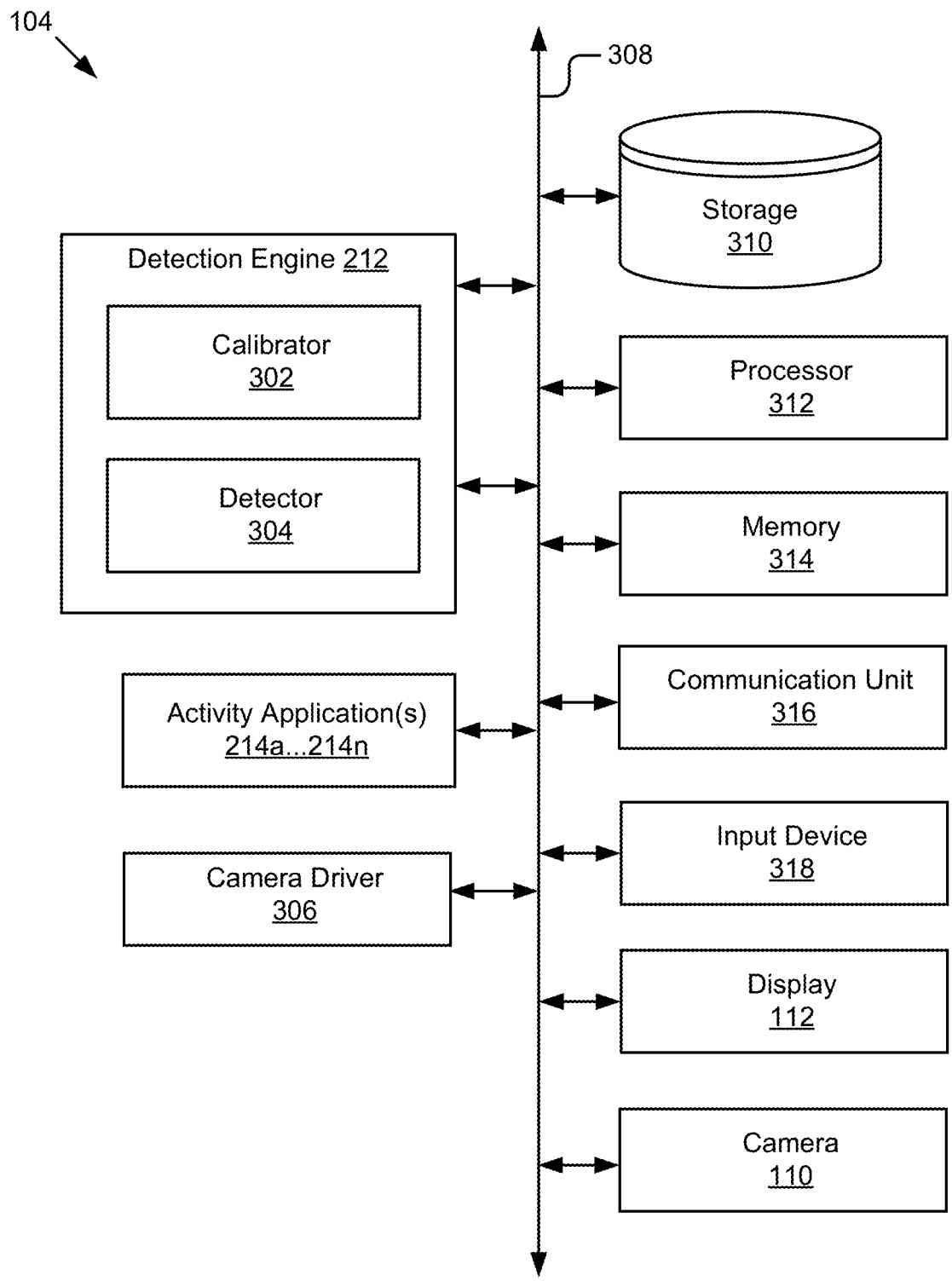
FIG. 3 is a block diagram illustrating an example computing device.

FIG. 3 is a block diagram of an example computing device 104. As depicted, the computing device 104 may include a processor 312, memory 314, communication unit 316, display 112, camera 110, and an input device 318, which are communicatively coupled by a communications bus 308. However, it should be understood that the computing device 104 is not limited to such and may include other elements, including, for example, those discussed with reference to the computing devices 104 in FIGS. 1 and 2.

The processor 312 may execute software instructions by performing various input/output, logical, and/or mathematical operations. The processor 312 has various computing architectures to process data signals including, for example, a complex instruction set computer (CISC) architecture, a reduced instruction set computer (RISC) architecture, and/or an architecture implementing a combination of instruction sets. The processor 312 may be physical and/or virtual, and may include a single core or plurality of processing units and/or cores.

The memory 314 is a non-transitory computer-readable medium that is configured to store and provide access to data to the other elements of the computing device 104. In some implementations, the memory 314 may store instructions and/or data that may be executed by the processor 312. For example, the memory 314 may store the detection engine 212, the activity application(s) 214, and the camera driver 306. The memory 314 is also capable of storing other instructions and data, including, for example, an operating system, hardware drivers, other software applications, data, etc. The memory 314 may be coupled to the bus 308 for communication with the processor 312 and the other elements of the computing device 104.

The communication unit 316 may include one or more interface devices (I/F) for wired and/or wireless connectivity with the network 206 and/or other devices. In some implementations, the communication unit 316 may include transceivers for sending and receiving wireless signals. For instance, the communication unit 316 may include radio transceivers for communication with the network 206 and for communication with nearby devices using close-proximity (e.g., Bluetooth®, NFC, etc.) connectivity. In some implementations, the communication unit 316 may include ports for wired connectivity with other devices. For example, the communication unit 316 may include a CAT-5 interface, Thunderbolt™ interface, FireWire™ interface, USB interface, etc.

The display 112 may display electronic images and data output by the computing device 104 for presentation to a user 222. The display 112 may include any conventional display device, monitor or screen, including, for example, an organic light-emitting diode (OLED) display, a liquid crystal display (LCD), etc. In some implementations, the display 112 may be a touch-screen display capable of receiving input from one or more fingers of a user 222. For example, the display 112 may be a capacitive touch-screen display capable of detecting and interpreting multiple points of contact with the display surface. In some implementations, the computing device 104 may include a graphics adapter (not shown) for rendering and outputting the images and data for presentation on display 112. The graphics adapter (not shown) may be a separate processing device including a separate processor and memory (not shown) or may be integrated with the processor 312 and memory 314.

The input device 318 may include any device for inputting information into the computing device 104. In some implementations, the input device 318 may include one or more peripheral devices. For example, the input device 318 may include a keyboard (e.g., a QWERTY keyboard), a pointing device (e.g., a mouse or touchpad), microphone, a camera, etc. In some implementations, the input device 318 may include a touch-screen display capable of receiving input from the one or more fingers of the user 222. For instance, the functionality of the input device 318 and the display 112 may be integrated, and a user 222 of the computing device 104 may interact with the computing device 104 by contacting a surface of the display 112 using one or more fingers. In this example, the user 222 could interact with an emulated (i.e., virtual or soft) keyboard displayed on the touch-screen display 112 by using fingers to contact the display 112 in the keyboard regions.

The detection engine 212 may include a detector 304. The elements 212 and 304 may be communicatively coupled by the bus 308 and/or the processor 312 to one another and/or the other elements 214, 306, 310, 314, 316, 318, 112, and/or 110 of the computing device 104. In some implementations, one or more of the elements 212 and 304 are sets of instructions executable by the processor 312 to provide their functionality. In some implementations, one or more of the elements 212 and 304 are stored in the memory 314 of the computing device 104 and are accessible and executable by the processor 312 to provide their functionality. In any of the foregoing implementations, these components 212, and 304 may be adapted for cooperation and communication with the processor 312 and other elements of the computing device 104.

The detector 304 includes software and/or logic for processing the video stream captured by the camera 110 to detect physical interface object(s) 120 included in the video stream. In some implementations, the detector 304 may identify line segments related to physical interface object(s) 120 included in the physical activity scene 116. In some implementations, the detector 304 may be coupled to and receive the video stream from the camera 110, the camera driver 306, and/or the memory 314. In some implementations, the detector 304 may process the images of the video stream to determine positional information for the line segments related to the physical interface object(s) 120 in the activity scene 116 (e.g., location and/or orientation of the line segments in 2D or 3D space) and then analyze characteristics of the line segments included in the video stream to determine the identities and/or additional attributes of the line segments.

The detector 304 may recognize the line by identifying its contours. The detector 304 may also identify various attributes of the line, such as colors, contrasting colors, depth, texture, etc. In some implementations, the detector 304 may use the description of the line and the lines attributes to identify the physical interface object(s) 120 by comparing the description and attributes to a database of objects and identifying the closest matches.

The detector 304 may be coupled to the storage 310 via the bus 308 to store, retrieve, and otherwise manipulate data stored therein. For example, the detector 304 may query the storage 310 for data matching any line segments that it has determined are present in the physical activity scene 116. In all of the above descriptions, the detector 304 may send the detected images to the detection engine 212 and the detection engine 212 may perform the above described features.

The detector 304 may be able to process the video stream to detect sequences of physical interface object(s) 120 on the physical activity scene 116. In some implementations, the detector 304 may be configured to understand relational aspects between the physical interface object(s) 120 and determine a sequence, interaction, change, etc. based on the relational aspects. For example, the detector 304 may be configured to identify an interaction related to one or more physical interface object(s) 120 present in the physical activity scene 116 and the activity application(s) 214 may execute a series of commands based on the relational aspects between the one or more physical interface object(s) 120 and the interaction. For example, the interaction may be pressing a button incorporated into a physical interface object(s) 120.

The activity application(s) 214 include software and/or logic for receiving a sequence of physical interface object(s) 120 and identifying corresponding commands that can be executed in the virtual scene 118. The activity application(s) 214 may be coupled to the detector 304 via the processor 312 and/or the bus 308 to receive the detected physical interface object(s) 120. For example, a user 222 may arrange a sequence of physical interface object(s) 120 on the physical activity scene 116. The detection engine 212 may then notify the activity application(s) 214 that a user has pressed an "execution block" in the sequence of the physical interface object(s) 120, causing the activity application(s) 214 to execute a set of commands associated with each of the physical interface object(s) 120 and manipulate the target virtual object 122 (e.g., move, remove, adjust, modify, etc., the target virtual object 122 and/or other objects and/or parameters in the virtual scene).

In some implementations, the activity application(s) 214 may determine the set of commands by searching through a database of commands that are compatible with the attributes of the detected physical interface object(s) 120. In some implementations, the activity application(s) 214 may access a database of commands stored in the storage 310 of the computing device 104. In further implementations, the activity application(s) 214 may access a server 202 to search for commands. In some implementations, a user 222 may predefine a set of commands to include in the database of commands. For example, a user 222 can predefine that an interaction with a specific physical interface object 120 included in the physical activity scene 116 to prompt the activity application(s) 214 to execute a predefined set of commands based on the interaction.

In some implementations, the activity application(s) 214 may enhance the virtual scene 118 and/or the target virtual object 122 as part of the executed set of commands. For example, the activity application(s) 214 may display visual enhancements as part of executing the set of commands. The visual enhancements may include adding color, extra virtualizations, background scenery, etc. In further implementations, the visual enhancements may include having the target virtual object 122 move or interact with another virtualization (124) in the virtual scene 118.

In some instances, the manipulation of the physical interface object(s) 120 by the user 222 in the physical activity scene 116 may be incrementally presented in the virtual scene 118 as the user 222 manipulates the physical interface object(s) 120, an example of which is shown in FIG. 9. Non-limiting examples of the activity applications 214 may include video games, learning applications, assistive applications, storyboard applications, collaborative applications, productivity applications, etc.

The camera driver 306 includes software storable in the memory 314 and operable by the processor 312 to control/operate the camera 110. For example, the camera driver 306 is a software driver executable by the processor 312 for signaling the camera 110 to capture and provide a video stream and/or still image, etc. The camera driver 306 is capable of controlling various features of the camera 110 (e.g., flash, aperture, exposure, focal length, etc.). The camera driver 306 may be communicatively coupled to the camera 110 and the other components of the computing device 104 via the bus 308, and these components may interface with the camera driver 306 via the bus 308 to capture video and/or still images using the camera 110.

As discussed elsewhere herein, the camera 110 is a video capture device configured to capture video of at least the activity surface 102. The camera 110 may be coupled to the bus 308 for communication and interaction with the other elements of the computing device 104. The camera 110 may include a lens for gathering and focusing light, a photo sensor including pixel regions for capturing the focused light and a processor for generating image data based on signals provided by the pixel regions. The photo sensor may be any type of photo sensor including a charge-coupled device (CCD), a complementary metal-oxide-semiconductor (CMOS) sensor, a hybrid CCD/CMOS device, etc. The camera 110 may also include any conventional features such as a flash, a zoom lens, etc. The camera 110 may include a microphone (not shown) for capturing sound or may be coupled to a microphone included in another component of the computing device 104 and/or coupled directly to the bus 308. In some implementations, the processor of the camera 110 may be coupled via the bus 308 to store video and/or still image data in the memory 314 and/or provide the video and/or still image data to other elements of the computing device 104, such as the detection engine 212 and/or activity application(s) 214.

The storage 310 is an information source for storing and providing access to stored data, such as a database of commands, user profile information, community developed commands, virtual enhancements, etc., object data, calibration data, and/or any other information generated, stored, and/or retrieved by the activity application(s) 214.

In some implementations, the storage 310 may be included in the memory 314 or another storage device coupled to the bus 308. In some implementations, the storage 310 may be or included in a distributed data store, such as a cloud-based computing and/or data storage system. In some implementations, the storage 310 may include a database management system (DBMS). For example, the DBMS could be a structured query language (SQL) DBMS. For instance, storage 310 may store data in an object-based data store or multi-dimensional tables comprised of rows and columns, and may manipulate, i.e., insert, query, update, and/or delete, data entries stored in the verification data store 106 using programmatic operations (e.g., SQL queries and statements or a similar database manipulation library). Additional characteristics, structure, acts, and functionality of the storage 310 is discussed elsewhere herein.

Figure 4A:
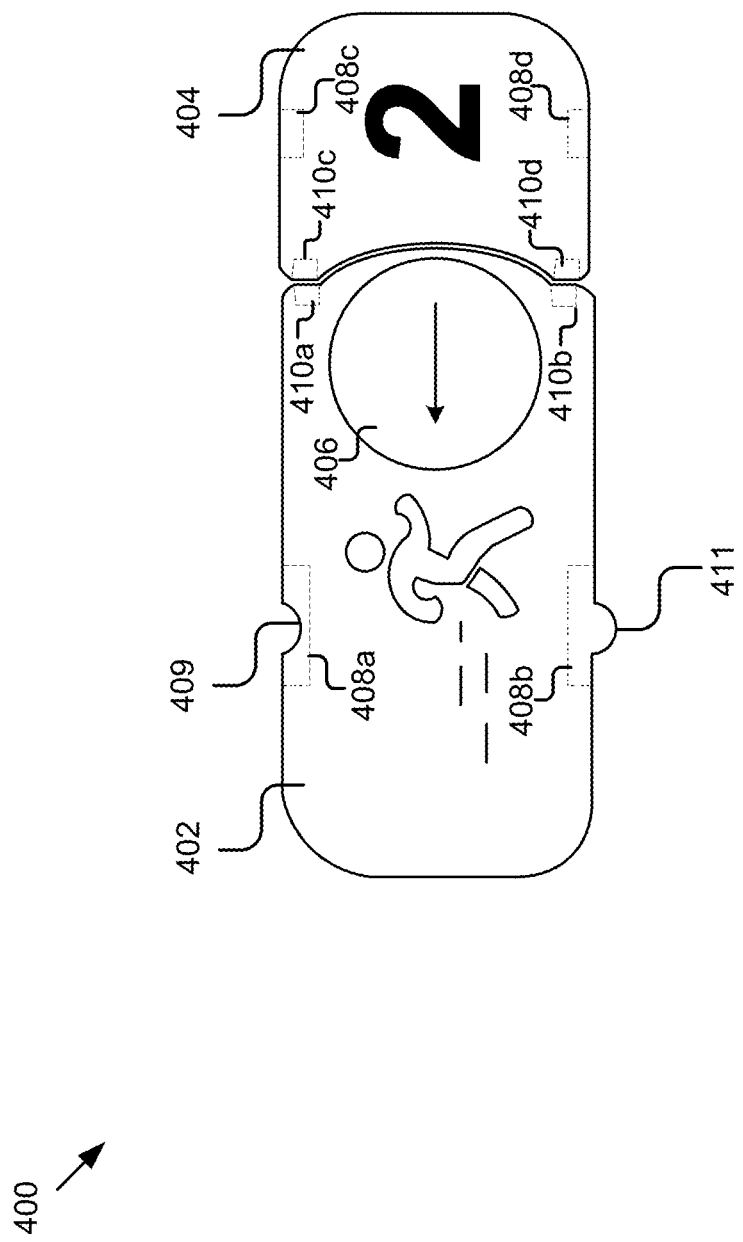

FIG. 4A is a graphical representation 400 illustrating an example physical interface object 120. In some implementations, the example physical interface object 120 may include two different regions, a command region 402 and a quantifier region 404. In some implementations, the command region 402 and the quantifier region 404 may be different regions of the same (e.g., a single) physical interface object 120, while in further implementations, the command region 402 and quantifier region 404 may be separable objects (e.g., tiles (also called blocks)) that can be coupled together to form a coupled command region 402 and quantifier region 404. For example, the quantifier regions 404, may represent various numbers and different quantifier regions may be coupled with different command regions 402 to form various programming commands.

The command region 402 may represent various actions, such as walking, jumping, interacting, etc. The command region 402 may correspond to the set of commands that causes the target virtual object 122 to perform the action depicted on the command region 402. The quantifier region 404 may act as a multiplier to the command region 402 and may correspond to a multiplying effect for the amount of times the set of commands are executed by the activity application(s) 214, causing the target virtual object 122 to perform the action the number of times represented by the quantifier region 404. For example, the command region 402 may represent the action to move and the quantifier region 404 may include the quantity "2", causing the activity application(s) 214 to execute a set of commands causing the target virtual object 122 to move two tiles. In some implementations, a command region 402 that does not include a quantifier region 404 may cause the activity application(s) 214 to execute a set of commands a single time, (or any other default alternative when quantifier region 404 may not be detected.)

In some implementations, the physical interface object(s) 120 may include a directional region 406. The directional region 406 may correspond to a set of commands representing a direction for an action represented in the command region 402. For example, the directional region 406 may be represented as an arrow and the direction of the arrow may represent a corresponding direction for a set of commands. In some implementations, a directional command may be represented by the directional region 406. The directional command may be able to point in any direction, including up, down, left, and/or right. In some implementations, the directional region 406 may be a dial that a user can rotate to point in different directions. The dial may be integrated into the physical interface object(s) 120 or the dial may be separable and may be configured to couple with the physical interface object(s) 120 to allow a user to rotate the dial. In some implementations, the directional region 406 may be rotatable, allowing a user to manipulate the directional region 406 to point in a variety of different directions. In some implementations, the detection engine 212 may be configured to identify the direction region 406 and use the direction region 406 to divide the physical interface object(s) 120 into the quantifier region 404 and the command region 402.

In some implementations, the physical interface object(s) 120 may be magnetic and may configured to magnetically fasten to adjacent objects. For instance, a given programming tile may include tile magnetic fasteners 408 and/or region magnetic fasteners 410. The tile magnetic fasteners 408 may be present on a top side and/or a bottom side of the physical interface object(s) 120 and allow a physical interface object(s) 120 to magnetically couple with other objects, such as additional physical interface object(s) 120, boundaries of the physical activity scene 116, etc. In some implementations, the tile magnetic fasteners 408 may magnetically couple with additional tile magnetic fasteners (not shown) on other physical interface object(s) 120. In further implementations, the objects being magnetically coupled with the physical interface object(s) 120 may include a ferromagnetic material that magnetically couples with the tile magnetic fasteners 408. In some implementations, the physical interface object(s) 120 may include two tile magnetic fasteners 408a/408c on a top side and/or two tile magnetic fasteners 408b/408d on a bottom side. While in further implementations, other quantities of tile magnetic fasteners 408 are contemplated, such as a single tile magnetic fasteners 408.

In another example, a given programming tile may include the region magnetic fasteners 410 on the left and/or right side of the programming tile that allow the programming tile to magnetically couple with an adjacent tile as depicted in FIG. 4A where the command region 402 may be magnetically coupled by the region magnetic fasteners 410 to the quantifier region 404. Non-limiting examples of a magnetic fastener include a magnet, a ferrous material, etc. Detachably fastening the physical interface object(s) 120 is advantageous as it allows a user to conveniently arrange a collection of objects in a logical form, drag a collection of fastened objects around the physical activity scene 116 without the collection falling apart and quickly manipulate physical interface objects(s) 120 by allowing the collection of fastened objects to quickly and neatly be assembled, etc.

Further, physical interface object(s) 120 may include one or more alignment mechanisms to align the physical interface object(s) 120 with other physical interface object(s) 120 (e.g., vertically horizontally, etc.). For example, a first physical interface object 120 may include a protrusion 411 on a bottom side which may be configured to mate with a recess (not shown for a following physical interface object 120, but may be similar to a recess 409 of the first physical interface object 120) of a following physical interface object 120 on a top side, and so on and so forth, although it should be understood that other suitable alignment mechanisms are also possible and contemplated (e.g., flat surfaces that are magnetically alignable, other compatible edge profiles (e.g., wavy surfaces, jagged surfaces, puzzle-piece shaped edges, other compatibly shaped protrusion(s) and/or recesses, other suitable fasteners (e.g., snaps, hooks, hook/repeat, etc.). As a further example, additional and/or alternative alignment mechanisms may include curved edges and protruding edges that are configured to nest within each other, etc.

In some implementations, the detection engine 212 may classify regions using machine learning models and/or one or more visual attributes of the regions (e.g., color, graphics, number, etc.) into commands and quantifiers. This allows the detection engine 212 to determine the actions, directionality, and/or numbers for the detected physical interface object(s) 120.

Figure 4B:
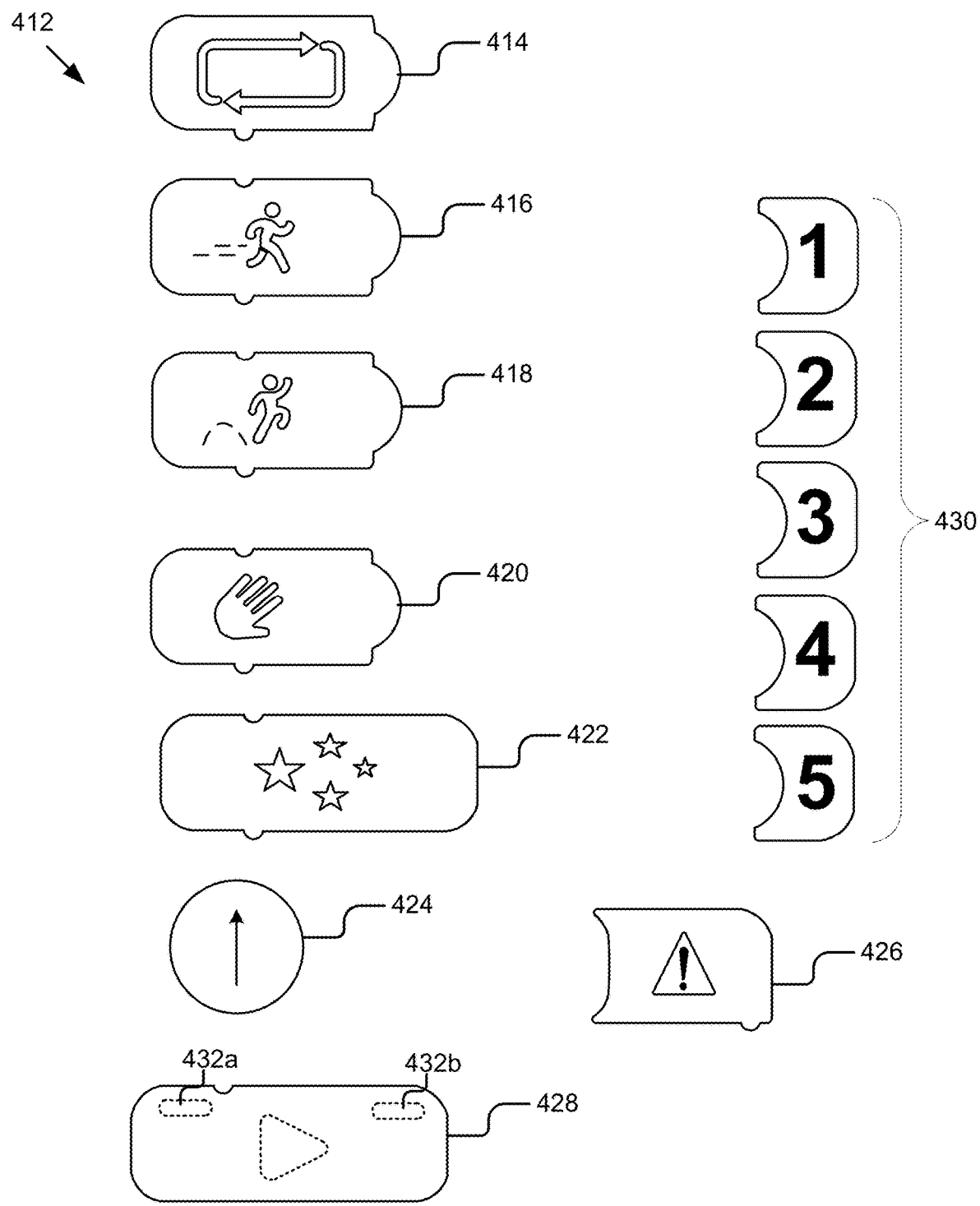

FIG. 4B is a graphical representation 412 illustrating example physical interface object(s) 120 represented as various programming tiles 414-430. In some implementations, the programming tiles may include verb tiles that represent various commands and other command tiles, adverb tiles that modify the verb tile, and/or units of measurements or quantities. Programming tile 414 may represent a repeat command. The activity application(s) 214 may associate the programming tile 414 with a repeat command that causes a sequence of commands to be repeated. The repeat command may be represented in some implementations by two arrows forming a circular design on the programming tile 414. In some implementations, the programming tile 414 may be coupled with a quantifier region 404 causing the repeat command to be executed a number of times represented by the quantifier region 404.

Programming tile 416 may represent a verb tile depicting a walk command that causes the activity application(s) 214 to cause a target virtual object 122 to move. The walk command may be represented in some implementations by an image of a character moving on the programming tile 416. In some implementations, the programming tile 416 may be coupled with a quantifier region 404 causing the walk command to be executed a number of times represented by the quantifier region 404.

Programming tile 418 may represent a verb tile depicting a jump command that causes the activity application(s) 214 to cause a target virtual object 122 to jump. The jump command may be represented in some implementations by an image of a character jumping on the programming tile 418. In some implementations, the programming tile 418 may be coupled with a quantifier region 404 causing the jump command to be executed a number of times represented by the quantifier region 404.

Programming tile 420 may represent a verb tile depicting a tool command that causes the activity application(s) 214 to cause a target virtual object 122 to interact with something in the virtual scene 118 and/or perform an action. The tool command may be represented in some implementations by an image of a hand on the programming tile 420. In some implementations, the programming tile 420 may be coupled with a quantifier region 404 causing the tool command to be executed a number of times represented by the quantifier region 404.

Programming tile 422 may represent a verb tile depicting a magic command that causes the activity application(s) 214 to cause a target virtual object 122 to perform a predefined command associated with the magic command. The magic command may be one example of an event command, while additional events may be included other than the magic command, such as a celebration event, a planting event, an attack event, a flashlight event, a tornado event, etc. The magic command may be represented in some implementations by an image of stars on the programming tile 422. In some implementations, the programming tile 422 may be coupled with a quantifier region 404 causing the magic command to be executed a number of times represented by the quantifier region 404.

Programming tile 424 may represent a verb tile depicting a direction command that causes the activity application(s) 214 to perform a command in a specific direction in the virtual scene 118. The direction command may be represented in some implementations by an image of an arrow on the programming tile 424. In some implementations, the programming tile 424 may be coupled with a command region 402 causing the command to be executed in a specific direction.

Programming tile 426 may represent a tile depicting an if command that causes the detection engine 212 to detect a specific situation and when the situation is present to perform a separate set of commands as indicated by the if command. The if command may be represented in some implementations by an exclamation point on the programming tile 416. In some implementations, the programming tile 426 may allow if/then instances to be programmed into a sequence of physical interface object(s) 120. In some implementations, the detection engine 212 may be configured to detect clusters of tiles separated by an if command, as described in more detail with reference to FIG. 5.

Programming tiles 430 may represent examples of quantifier regions 404 depicting various numerical values. The quantifier regions 404 may be coupled with other programming tiles to alter the amount of times a command may be executed.

Programming tile 428 may represent an execution block that causes the activity application(s) 214 to execute the current sequence of physical interface object(s) 120. In some implementations, the execution block may have one or more states. The detection engine 212 may be configured to determine the state of the execution block, and cause the activity application(s) 214 to execute the set of commands in response to detecting a change in the state. For example, one state may be a pressed-state and another state may be an unpressed-state. In the unpressed-state, the detection engine 212 may detect a visual indicator 432 that may optionally be included on the execution block. When a user interacts with the execution block, the visual indicator 432 may change causing the detection engine 212 to detect the pressed-state. For example, when a user pushes a button on the execution block, it may cause the visual indicator 432 (shown as slots) to change colors, disappear, etc. prompting the activity application(s) 214 to execute the set of commands.

The execution block can additional or alternatively have a semi-pressed state, in which a user may be interacting with the execution block, but has not yet fully transitioned between a pressed-state and an unpressed-state. The execution block may further include a rubbish state, in which the detection engine 212 may be unable to determine a state of the execution block and various parameters may be programmed for this state, such as waiting until a specific state change has been detected, inferring based on the arrangement of other physical interface object(s) 120 a reasonable state, etc.

FIG. 4C is a side view of a set 434 of physical interface object(s) 120a-120c and FIG. 4D is a side view of a stack 436 of the set of physical interface object(s) 120a-120c. As shown, a user may stack and/or unstack the physical interface object(s) 120a-120c for convenient storage and manipulation by nesting the physical interface object(s) together via compatible coupling portions.

In some implementations, each physical interface object(s) 120 may include compatible receiving portions 440 and engaging portions 438. The engaging portion 438 of a physical interface object 120 may be configured to engage with the receiving portion of an adjacently situated physical interface object 120 as shown in FIG. 4D allowing the physical interface object(s) 120 to stack in a flush manner, with no protrusions or gaps between the stacked physical interface object(s) 120. In some cases, a parameter adjustment mechanism, such as one including a direction region 406, may form the engaging portion 438 and may be configured to engage with a correspondingly sized receiving portion 440, such as a recess, as shown in the illustrated embodiment, although it should be understood that the engaging portion 438 and receiving portions 440 may be discrete members of the physical interface object(s) 120. More particularly, the engaging portion 438 may include the parameter adjustment mechanism forming a protrusion protruding outwardly from a front surface of the physical interface object(s) 120. Each physical interface object(s) 120a-120c depicted in the representation 434 includes a corresponding receiving portion 440 that may include a recess formed in a bottom surface of the physical interface object(s) 120. The recess may be configured to receive the protrusion, allowing the protrusion to nest within the recess of the physical interface object(s) 120 when the physical interface object(s) 120 are stacked as shown in FIG. 4D. In some implementations, the physical interface object(s) 120a-120(c) may magnetically couple when stacked. The magnetically coupling may occur based on top magnetic fasteners 442 and bottom magnetic fasteners 444 of adjacent physical interface object(s) 120 coupling together when the physical interface object(s) 120a-102c are in a stacked position as shown in FIG. 4D.

Figure 5:
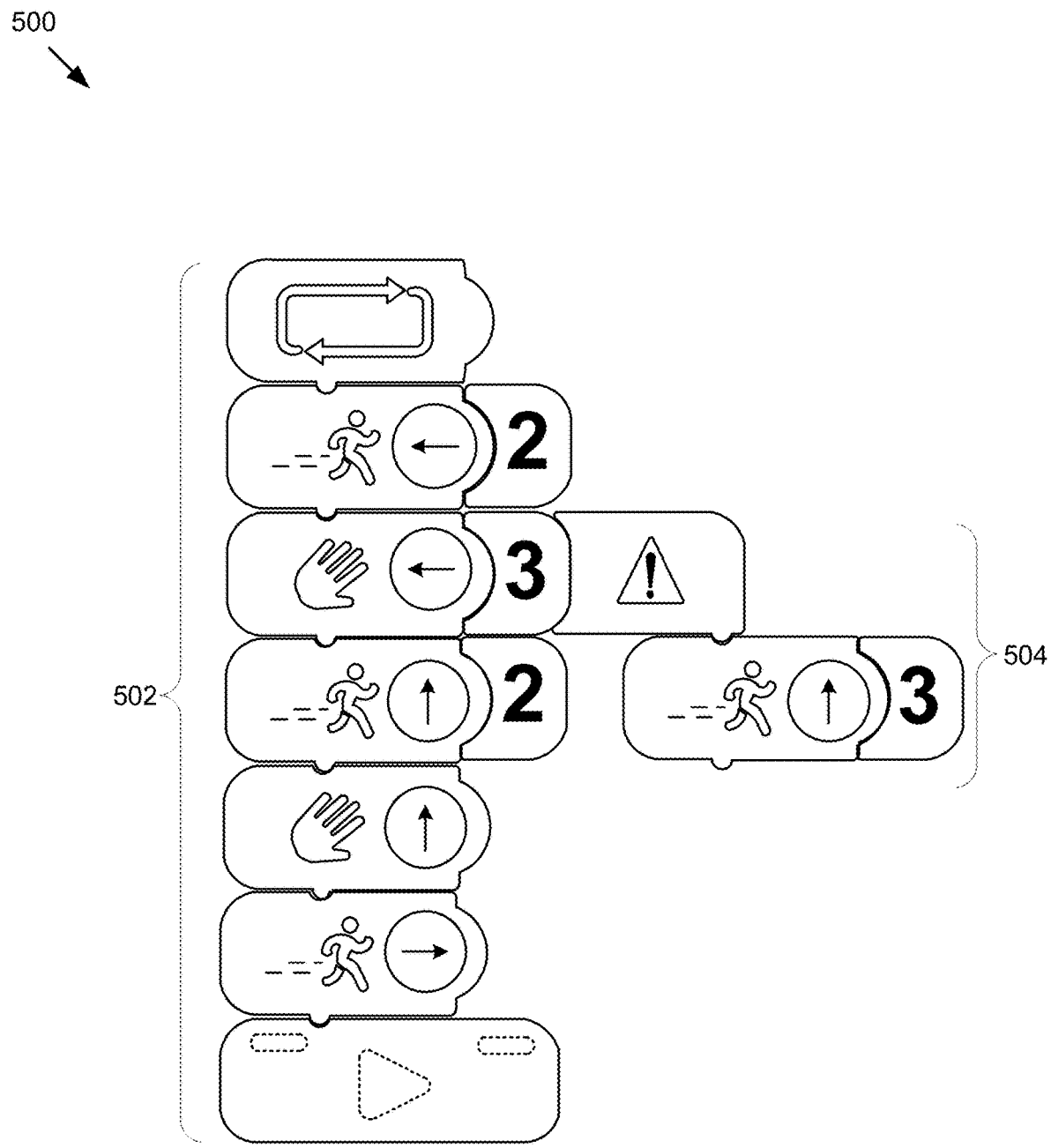
FIG. 5 is a graphical representation illustrating an example sequence of physical interface objects.

FIG. 5 may be a graphical representation 500 representing an example sequence of physical interface object(s) 120. In some implementations, the detection engine 212 may detect a sequence 502 of physical interface object(s) 120. In some implementations, the detection engine 212 may detect a sequence as including at least one command tile and an execution block. In the illustrated example, the sequence 502 includes multiple command tiles, quantifier tiles, and an execution block coupled together and representing a specific set of commands. In further implementations, other sequences of physical interface object(s) 120 are contemplated. In further implementations, the detection engine 212 may be configured to identify separate clusters that are portions of the sequence, for example, cluster 504 may represent a separate set of commands to perform in response to an if tile indicating an interrupt and may cause the activity application(s) 214 to halt execution of a previous section of the sequence in order to execute the new cluster 504 when conditions for the interrupt are satisfied. The detection engine 212 may be configured to determine various clusters and subroutines related to those clusters.

In some implementations, the detection engine 212 may determine statistically likely locations for certain physical interface object(s) 120 based on the clustering. For example, two or more clusters may be represented by two branches of a sequence in the physical activity scene, and based on the clusters; the detection engine 212 may determine two possible positions for an end object (e.g., play button.) The activity application(s) 214 may be configured to inject a candidate into the set of commands based on the possible positions of the object. For example, the detection engine 212 may identify likely candidates for a missing physical interface object(s) 120 and the activity application(s) 214 may inject the likely candidate into the set of commands at the candidate location (e.g., the portion of the set of commands determined to be missing.) In further implementations, if the detection engine 212 detects that the sequence of physical interface object(s) 120 exceed a boundary of the physical activity scene 116, then the detection engine 212 may use statistical probabilities of likely locations for an execution block and execute the commands associated with the detected physical interface object(s) 120.

In some implementations, the detection engine 212 may determine if there are missing object candidates, determine approximate candidates, and populate the positions of the missing object candidates with the approximations. For example, in some cases, an end object (e.g., play button) at the end of a string of objects may go undetected, and the detection engine 212 may automatically determine the absence of that object from likely positions, and add it as a candidate to those positions.

Figure 6:
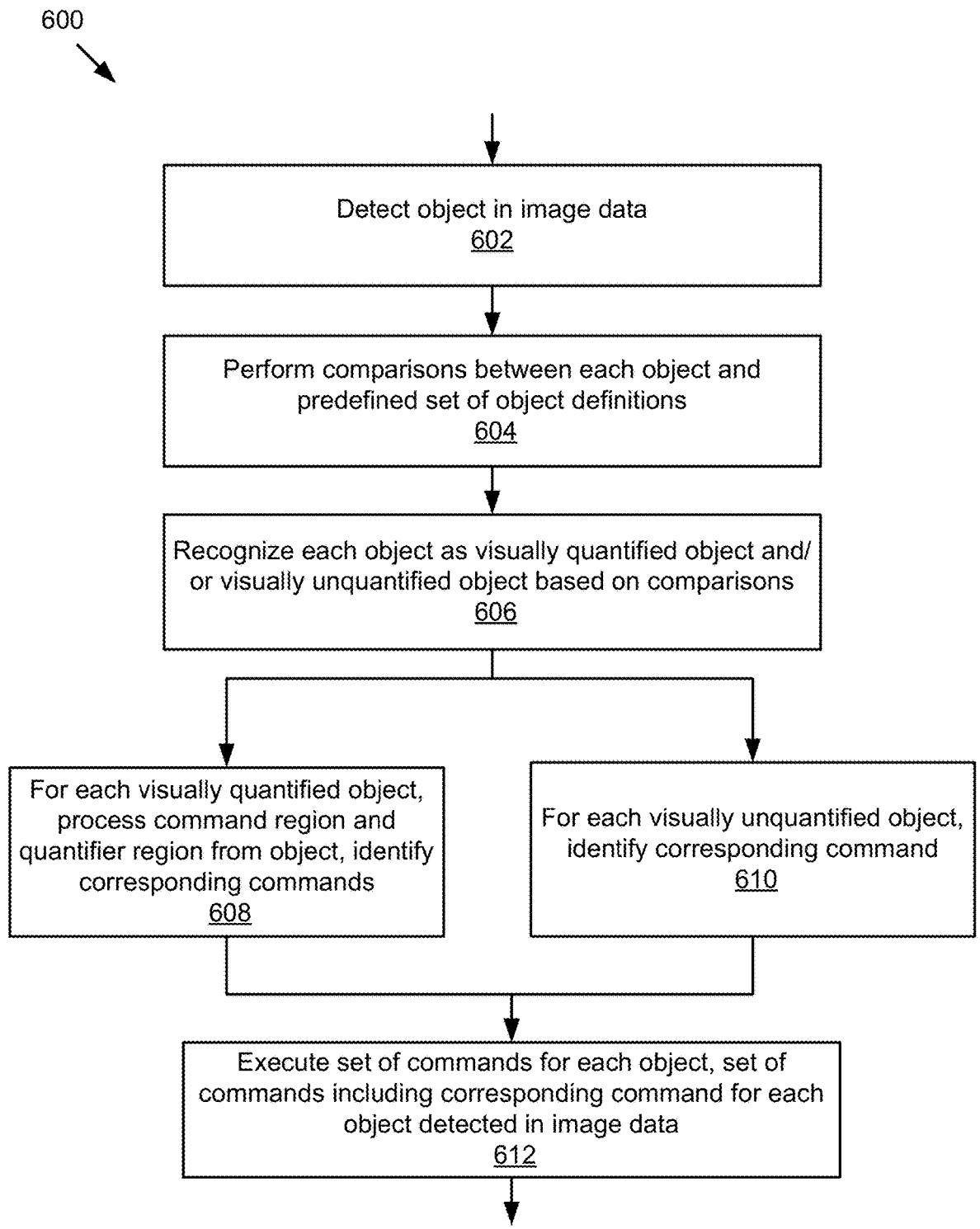
FIG. 6 is a flowchart of an example method for virtualized tangible programming.

FIG. 6 is a flowchart of an example method 600 for virtualized tangible programming. At 602, the detecting engine 212 may detect an object included in image data received from the video capture device 110. In some implementations, the detection engine detects the objects by analyzing specific frames of a video file from the image data and performs object and line recognition to categorize the detected physical interface object(s) 120. At 604, the detection engine 212 may perform a comparison between each of the detected physical interface object(s) 120 and a predefined set of object definitions. For example, the detection engine 212 may compare identified graphical attributes to identify various portions of programming tiles, such as those described in FIG. 4B. In further implementations, the detection engine 212 may identify a color of a physical interface object(s) 120 and/or other physical, detectable physical attribute(s) of the physical interface object(s) 120 (e.g., texture, profile, etc.), and identify the object based on the physical attribute(s) (e.g., color).

At 606, the detection engine 212 may recognize one of more of the physical interface object(s) 120 as a visually quantified object and/or a visually unquantified object based on the comparisons. A visually quantified object may include a physical interface object(s) 120 that quantifies a parameter, such as a direction, a numerical value, etc. Visually quantified objects may include command regions 402 coupled with quantifier regions 404. In some implementations, visually quantified objects may also include command regions 402 that are generally coupled with quantifier regions 404, but are set to a default numerical value (such as "1") when no quantifier region 404 is coupled to the command region 402. Visually unquantified objects may, in some cases not explicitly quantify parameters, or may quantify parameters in a manner that is different from the visually quantified objects. Visually unquantified objects may include physical interface object(s) 120 that the detection engine 212 does not expect to be coupled with a quantifier region 404, such as an execution block 428, magic tile 422, and/or if tile 426 as examples.

At 608, the detection engine 212 may process the command region 402 and/or the quantifier region 404 for each visually quantified object and identify corresponding commands. The corresponding commands may include commands related to specific command regions 402 and multipliers of the command related to quantities detected in the quantifier region 404. The detection engine 212 may use a specific set of rules to classify the command regions 402 and/or the quantifier regions 404 as described elsewhere herein.

At 610, in some implementations, the detection engine 212 may further identify corresponding commands for each visually unquantified object, such as if/then commands for repeat tiles, magic commands for magic tiles, and/or detecting states for the execution block.

At 612, the detection engine may be configured to provide the detected commands to the activity application(s) 214 and the activity application(s) 214 may compile the commands into a set of commands that may be executed on the computing device 104. The set of commands may include the specific sequence of the commands and the activity application(s) 214 may execute the sequence of commands in a linear fashion based on the order that the physical interface object(s) 120 were arranged in the physical activity scene 116. In some implementations, the activity application(s) 214 may be configured to detect any errors when compiling the set of commands and provide alerts to the user when the set of commands would not produce a desired result. For example, if an executed set of commands would move a target virtual object 122 into an area determined to be out of bounds, then the activity application(s) 214 may cause the virtual scene to present an indication that the set of commands are improper. In further implementations, the activity application(s) 214 may provide prompts and suggestions in response to the set of commands being improper. The prompts and/or suggestions may be based on other user's history on a specific level, machine learning of appropriate responses, etc.

Figure 7:
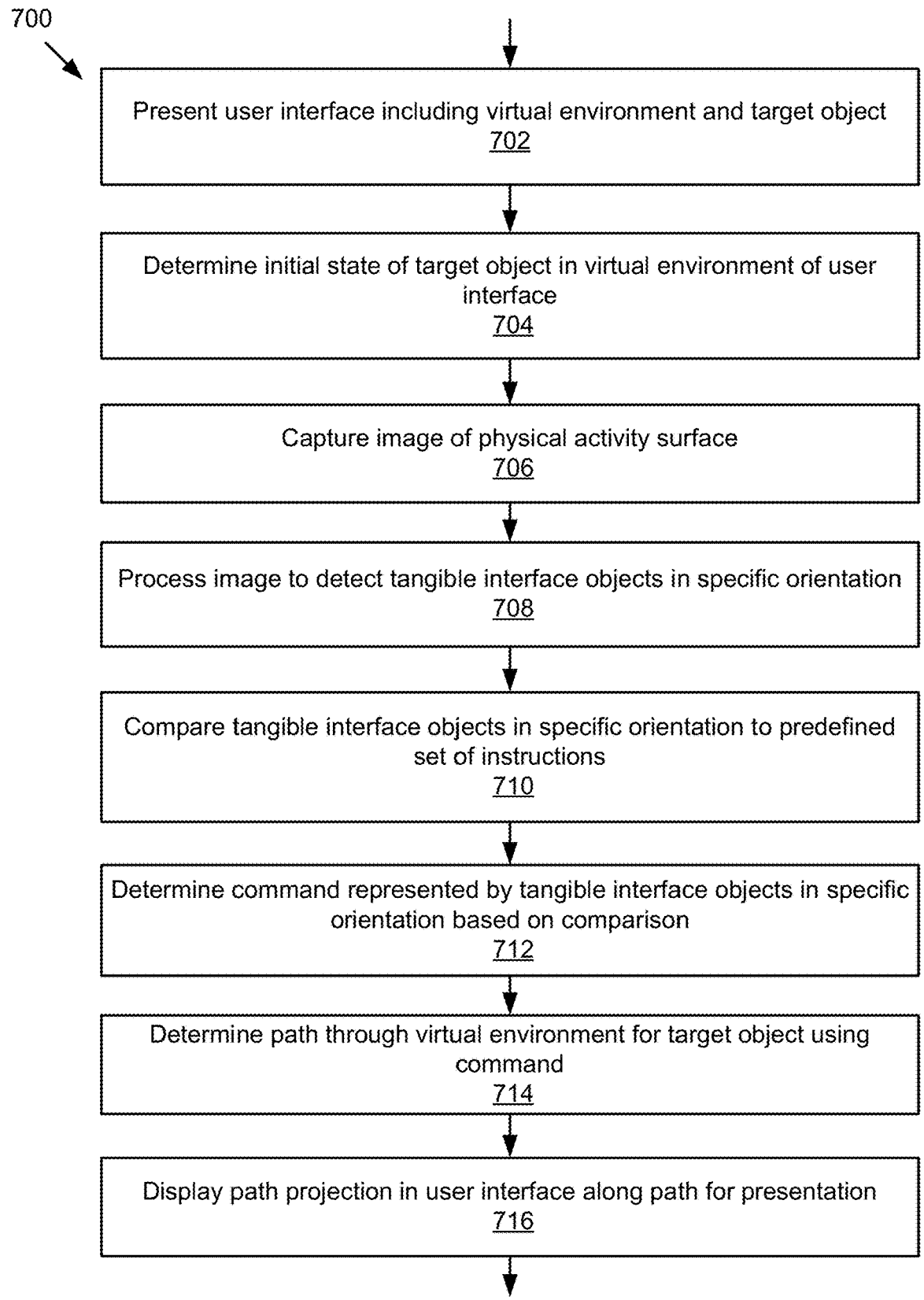
FIG. 7 is a flowchart of an example method for virtualized tangible programming.

FIG. 7 is a flowchart of an example method for virtualized tangible programming. At 702, the activity application(s) 214 may cause the display 112 to present a virtual environment. In further implementations, the activity application(s) 214 may cause the display to present a target virtual object within the virtual environment, the virtual environment may be an environment displayed in at least a portion of the virtual scene. For example, the virtual environment may include a forest setting displayed on a graphical user interface, and the target virtual object 122 may be a virtual character in the forest setting.

At 704, the activity application(s) 214 may determine an initial state of the target virtual object 122 in the virtual environment of the user interface. The initial state may be related to a specific location within the virtual environment, it may be an initial objective, a level, etc. For example, the target virtual object 122 may be present in the center of the display 112 and the goal of the target virtual object 122 may be to interact with an additional virtual object 124 also displayed in the virtual environment.

At 706, the video capture device 110 may capture an image of the physical activity surface 116. The physical activity surface may include an arrangement of physical interface object(s) 120. In some implementations, the video capture device 110 may capture multiple images of the physical activity surface 116 over a period of time to capture changes in the arrangement of the physical interface object(s) 120.

At 708, the detection engine 212 may receive the image from the video capture device 110 and process the image to detect the physical interface object(s) 120 in specific orientations. For example, the detection engine 212 may identify physical interface object(s) 120 that a user has arranged into a sequence. In further implementations, the detection engine 212 may be configured to ignore objects present in the physical activity scene 116 that are not oriented into a specific orientation. For example, if a user creates a sequence of physical interface object(s) 120 and pushes additional physical interface object(s) 120 to the side that were not used to create the sequence, then the detection engine 212 may ignore the additional physical interface object(s) 120 even though they are detectable and recognized within the physical activity scene 116.

At 710, the detection engine 212 may compare the physical interface object(s) 120 in the specific orientation to a predefined set of instructions. The predefined set of instructions may include commands related to the virtual scene represented by each of the physical interface object(s) present within the sequence. In some implementations, the predefined set of instructions may only relate to specific physical interface object(s) 120 present within the sequence, while other physical interface object(s) 120 do not include instruction sets. In further implementations, the instructions sets may include determining which physical interface object(s) 120 are visually quantified objects and which are visually unquantified objects. In some implementations, the predefined set of instructions may be built. Building the instruction set includes generating one or more clusters of physical interface object(s) 120 based on relative positions and/or relative orientations of the objects and determining a sequence for the commands of the instructions based on the clusters.

At 712, the activity application(s) 214 may determine a command represented by the physical interface object(s) 120 in a specific orientation based on the comparison. In some implementations, determining a command may include identifying command regions and quantifier regions of specific physical interface object(s) 120, while in further implementations, alternative ways of determining commands may be used based on how the set of commands are defined.

At 714, the activity application(s) 214 may determine a path through the virtual environment for the target virtual object 122 based on the command. The determined path may be based on a set of rules and may include a prediction of what will happen when the command is executed in the virtual environment. In further implementations, the determined path may be the effect of a sequence of physical interface object(s) 120 prior to formal execution. For example, if the commands cause the target virtual object to move two blocks right and down one block to access a strawberry (additional virtual object 124) then the activity application(s) 214 may determine a path based on the commands causing the target virtual object 122 to perform these actions.

At 716, the activity application(s) 214 may cause the display 122 to present a path projection within the virtual scene 118 in the user interface for presentation to the user. The path projection may be a visual indication of the effects of the command, such as highlighting a block the command would cause the target virtual object 122 to move. In another example, the activity application(s) 214 may cause an additional virtual object 124 to change colors to signal to the user that the command would cause the target virtual object 122 to interact with the additional virtual object 124.

Figure 8A:
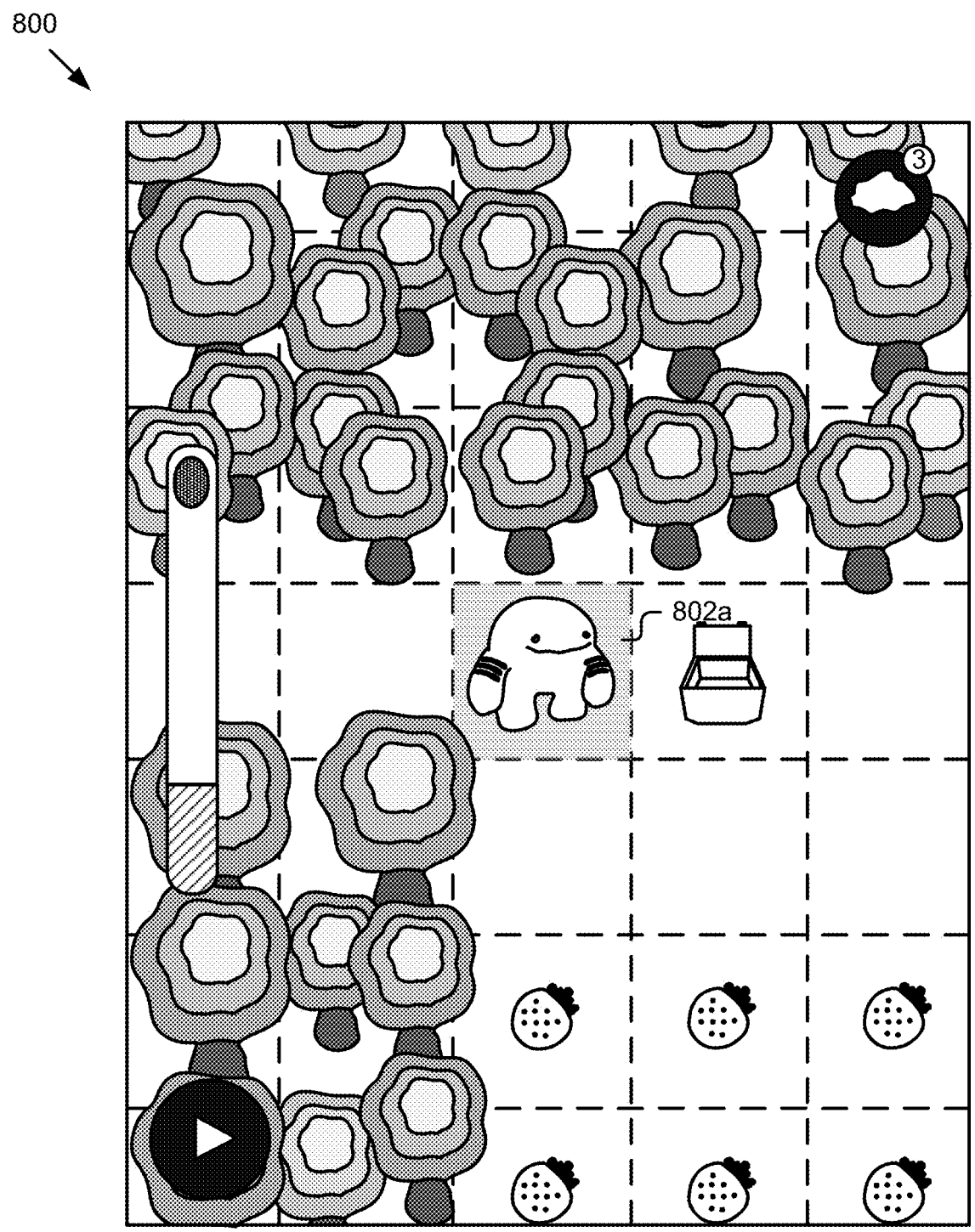
FIGS. 8A-8E are graphical representations illustrating example interfaces for virtualized tangible programming.
Figure 8B:
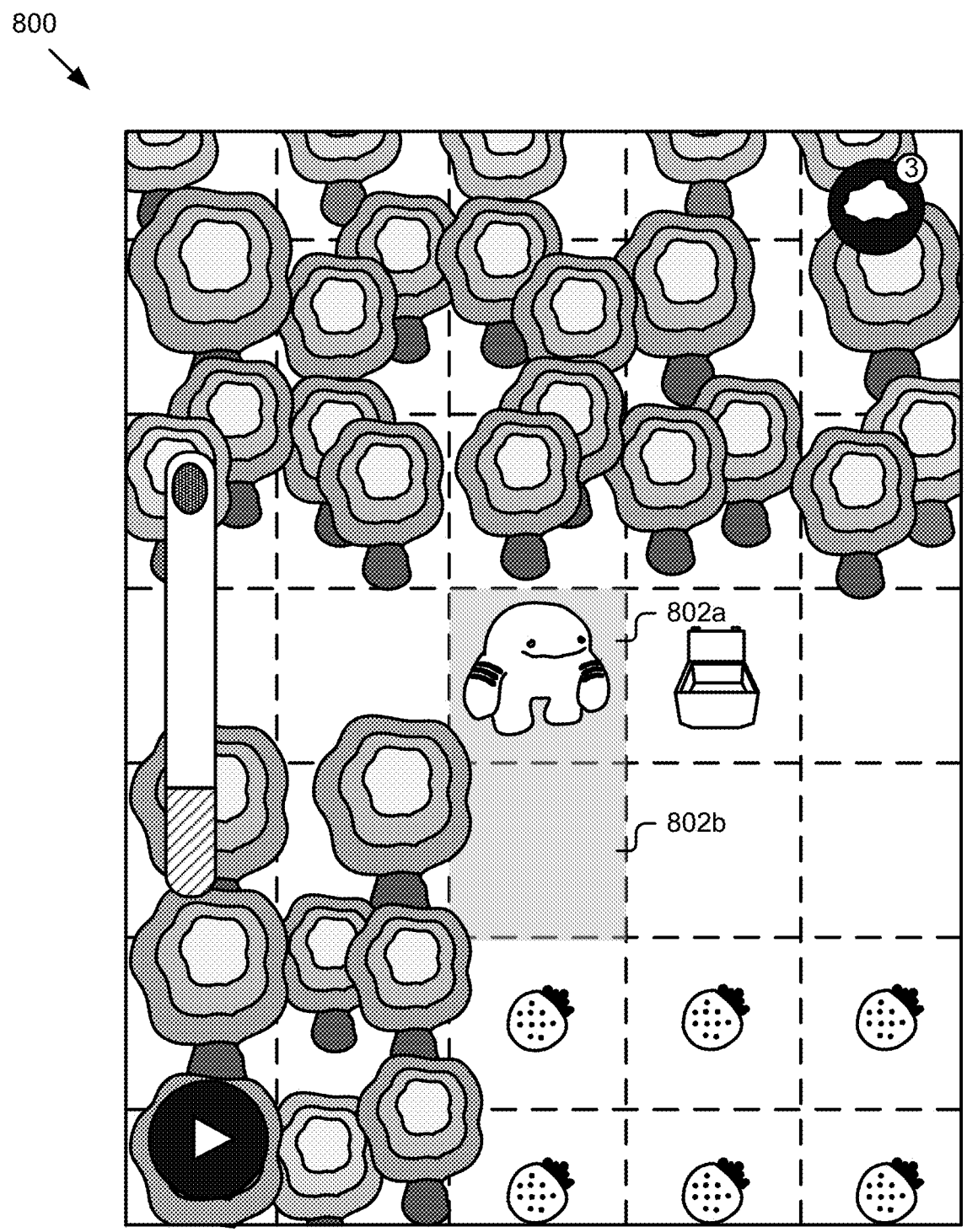
Figure 8C:
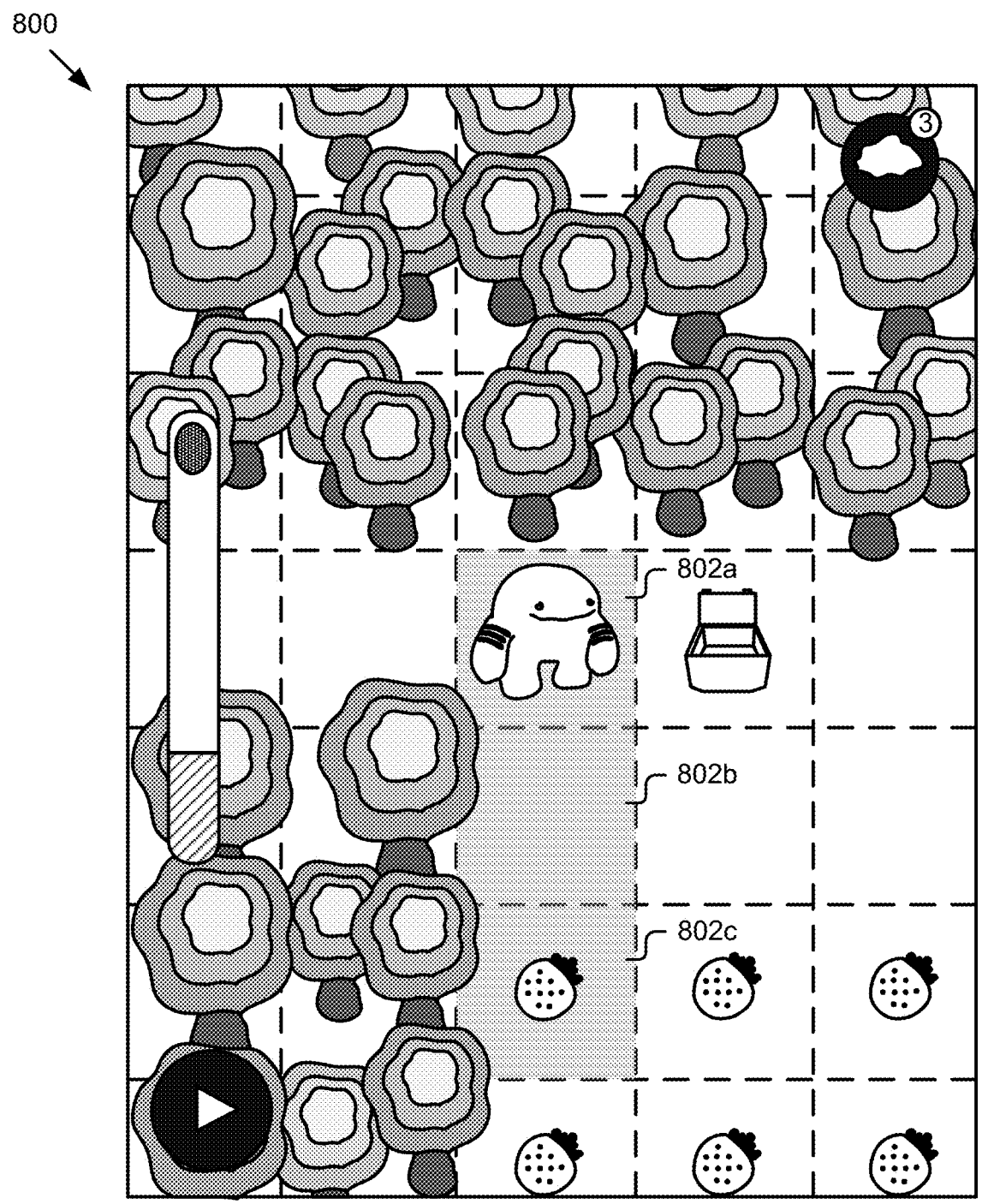
Figure 8D:
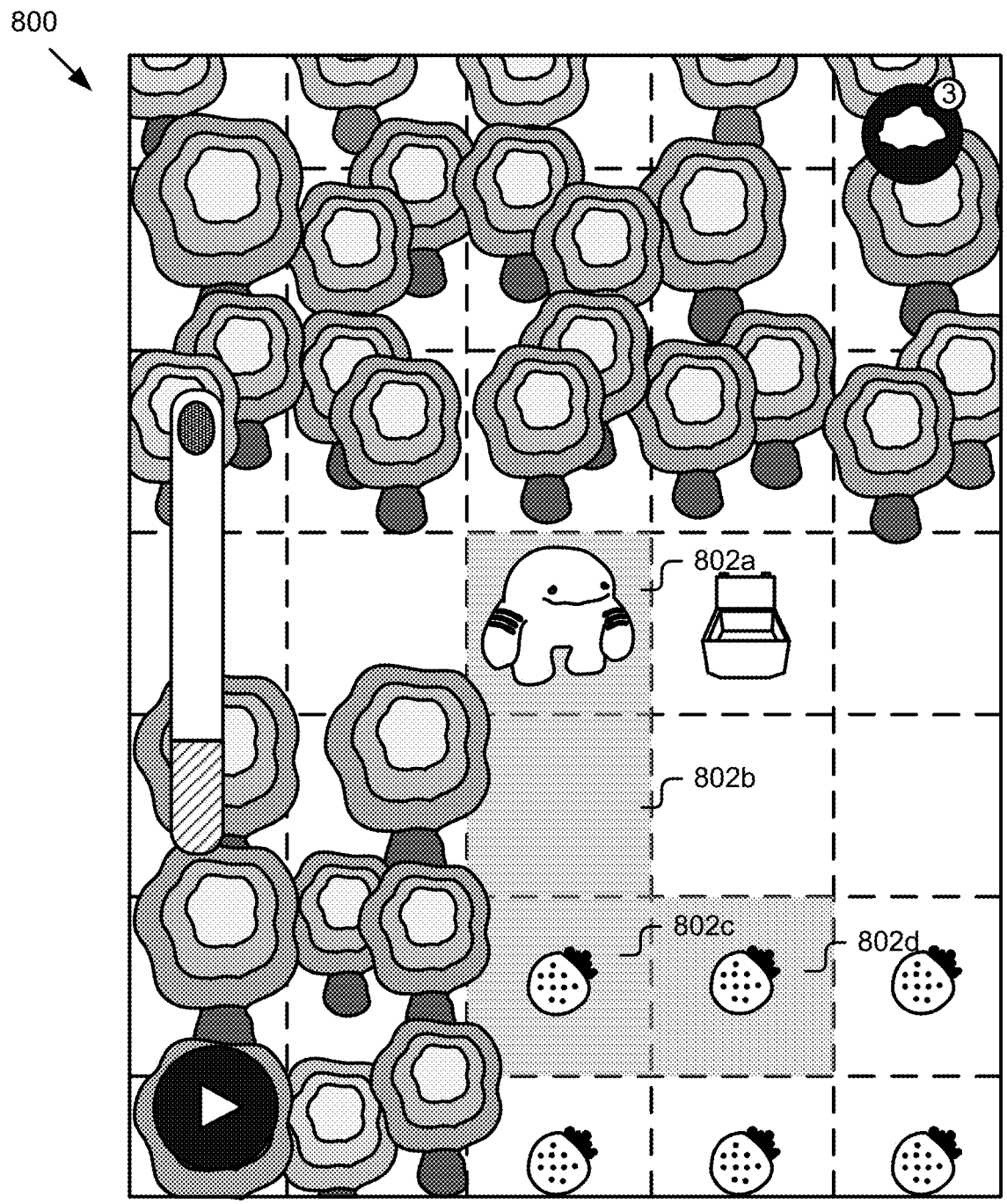

FIGS. 8A-8D are a graphical representation 800 illustrating an example interface for virtualized tangible programming that includes progressive path highlighting. In FIG. 8A, the virtual scene 118 includes a target virtual object 122 and includes a path projection 802a showing a command that would cause the target virtual object 122 to perform an action on the current tile in the path projection 802a. In FIG. 8B, the path projection 802b has been extended a block representing a command that would cause the target virtual object 122 to move to the tile shown in the path projection 802b. In FIG. 8C, the path projection 802c, has been extended an additional block representing a command to move two tiles. In some implementations, the path projection 802 may update as additional physical interface object(s) 120 are added to a sequence and the commands are displayed in the path projection 802. In this specific example, the path projection 802c may have been displayed based on either an additional command tile being added to the sequence or a command tile receiving a quantifier region to multiply the amount of times the command to move is performed. In FIG. 8d, the path projection 802d, has been extended a tile to the right showing the addition of another command in a different direction. The path projection 802 shown in this example is merely illustrative, and various path projection based on a sequence of physical interface object(s) 120 are contemplated.

Figure 8E:
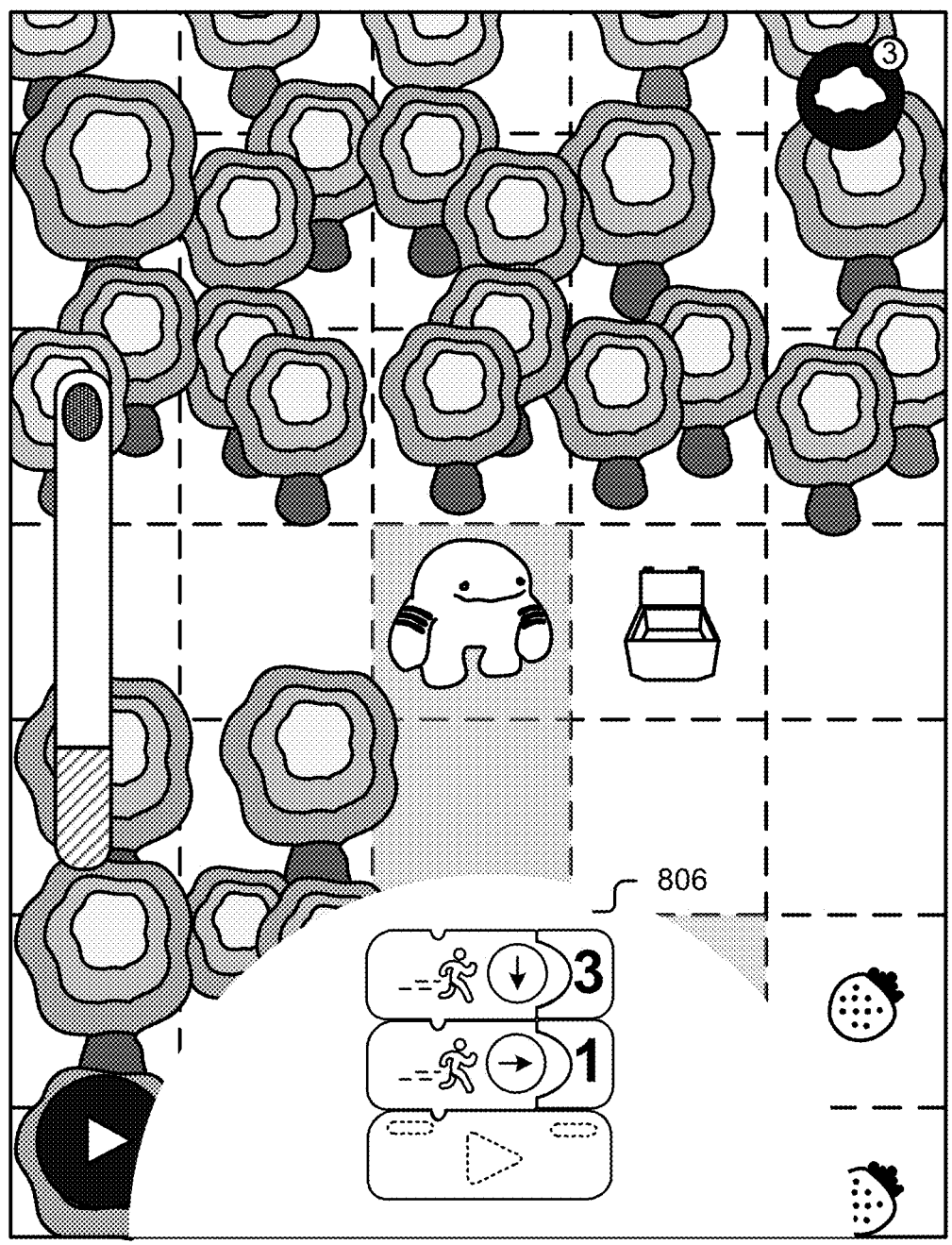

FIG. 8E is a graphical representation 804 of an example interface for virtualized tangible programming. In the example interface, a command detection window 806 is displayed showing the physical interface object(s) 120 detected in a sequence by the detection engine 212. The activity application(s) 214 may display the identified sequence as a way of providing feedback to a user as commands are identified. By displaying the detected sequence in a command detection window 806, the activity application(s) 214 may signal to a user when a sequence is detected, if there are detection errors, or additional commands for the user to review.

Figure 9A:
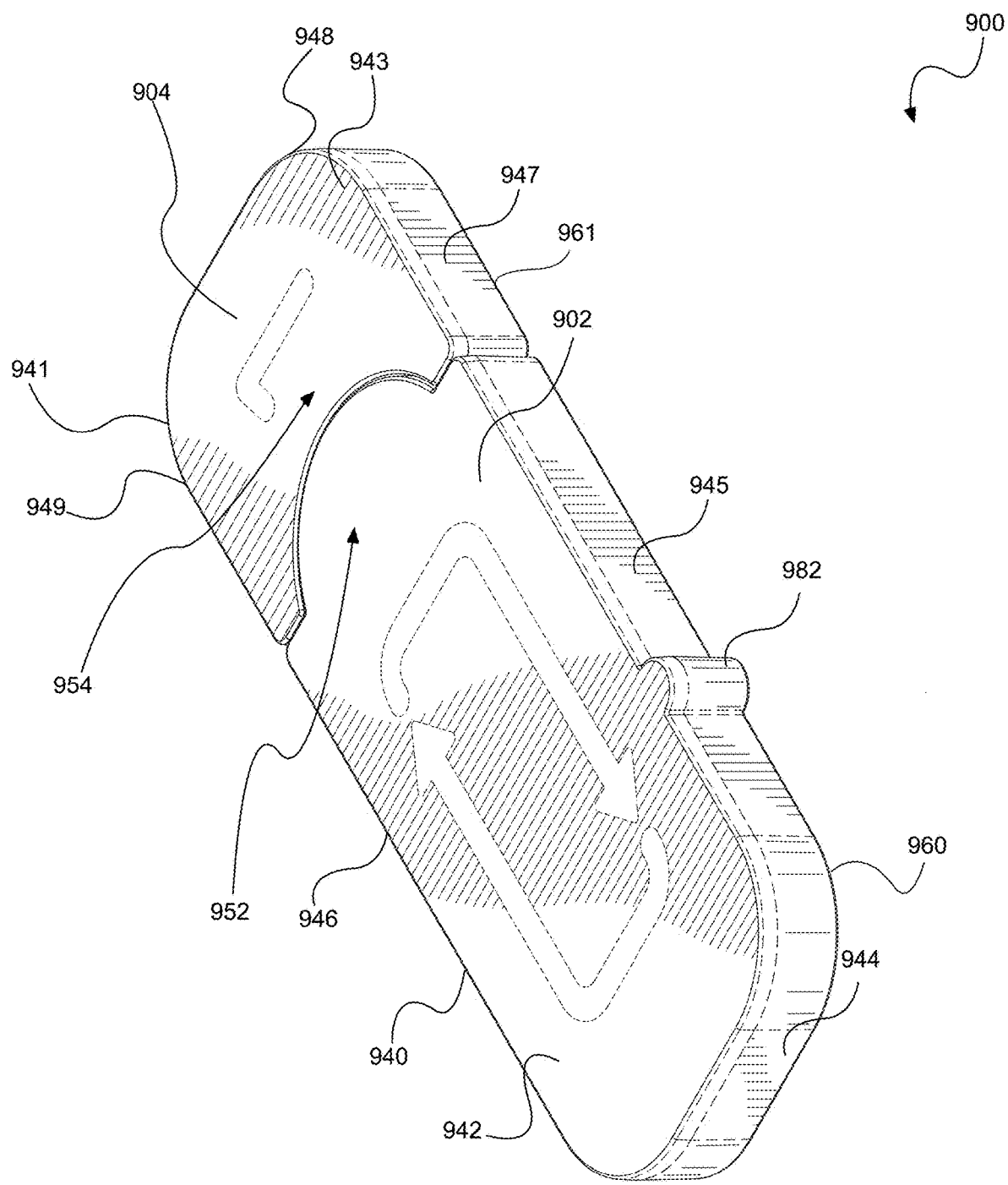
FIGS. 9A-13H portray various views of example physical interface objects.

FIG. 9A is a perspective view of an example programming tile 900. The programming tile 900 includes a first portion 940 and a second portion 941. The first portion 940 includes a command region 902. For example, as depicted, the command region 902 may include a visual indicator representing a repeat command (e.g., recursive arrows), which may be processed by the system 100, as discussed elsewhere herein. The second portion 941 includes a quantifier region 904. For example, as depicted, the quantifier region 904 includes a visual indicator representing a numeral (e.g., the number 1), which may be processed by the system 100, as discussed elsewhere herein.

The first portion 940 may comprise a body having a plurality of surfaces. For instance, as depicted, the first portion 940 may include a front surface 942, a back surface 960, a first side surface 944, a second side surface 945, a third side surface 946, and a tile coupling portion 952 having one or more sides. One or more of the surfaces of the first portion 940 may include components of one or more tile alignment mechanisms. As discussed elsewhere herein, the tile alignment mechanism conveniently allows for the alignment of two adjacently situated tiles. In some cases, as two tiles are situated sufficiently close to one another such that the corresponding alignment components comprising the alignment mechanism can engage, the alignment mechanism alliance the two tiles so they engage properly. As a further example, the coupling of the two tiles may be assisted by compatible magnetic components included in the tiles that are configured to magnetically couple as the tiles are adjacently situated such that the alignment components may engage. The alignment mechanism can advantageously automatically align the tiles as the tiles become magnetically coupled.

As shown, the front surface 942 may extend from the first side surface 944 to an edge of the tile coupling portion 952, as well as from the third side surface 946 to the second side surface 945. The front surface 942 may bear and/or incorporate the command region 902. The first side surface 944 may be connected to the back side surface 960 by the first side surface 944, the second side surface 945, the third side surface 946, and/or the one or more sides of the tile coupling portion 952. In the depicted embodiment, the first side surface 944, the second side surface 945, and the third side surface 946 are depicted as being perpendicular to the front surface 942 in the back surface 960, although it should be understood that the surfaces 942, 960, 944, 945, and/or 946 may have other forms and/or profiles (e.g., may be rounded, polygonal, have complex shapes, may be partial surfaces and/or include voids, etc.), etc. In some embodiments, the surfaces 944, 945, 946, etc., of the first portion 940 may be contiguous, and collectively form the outer sides of the body.

The second portion 941 may comprise a body having a plurality of surfaces. For instance, as depicted, the second portion 941 may include a front surface 943, a back surface 961, a first side surface 948, a second side surface 947, a third side surface 949, and the tile coupling portion 954 having one or more sides.

Figure 9B:
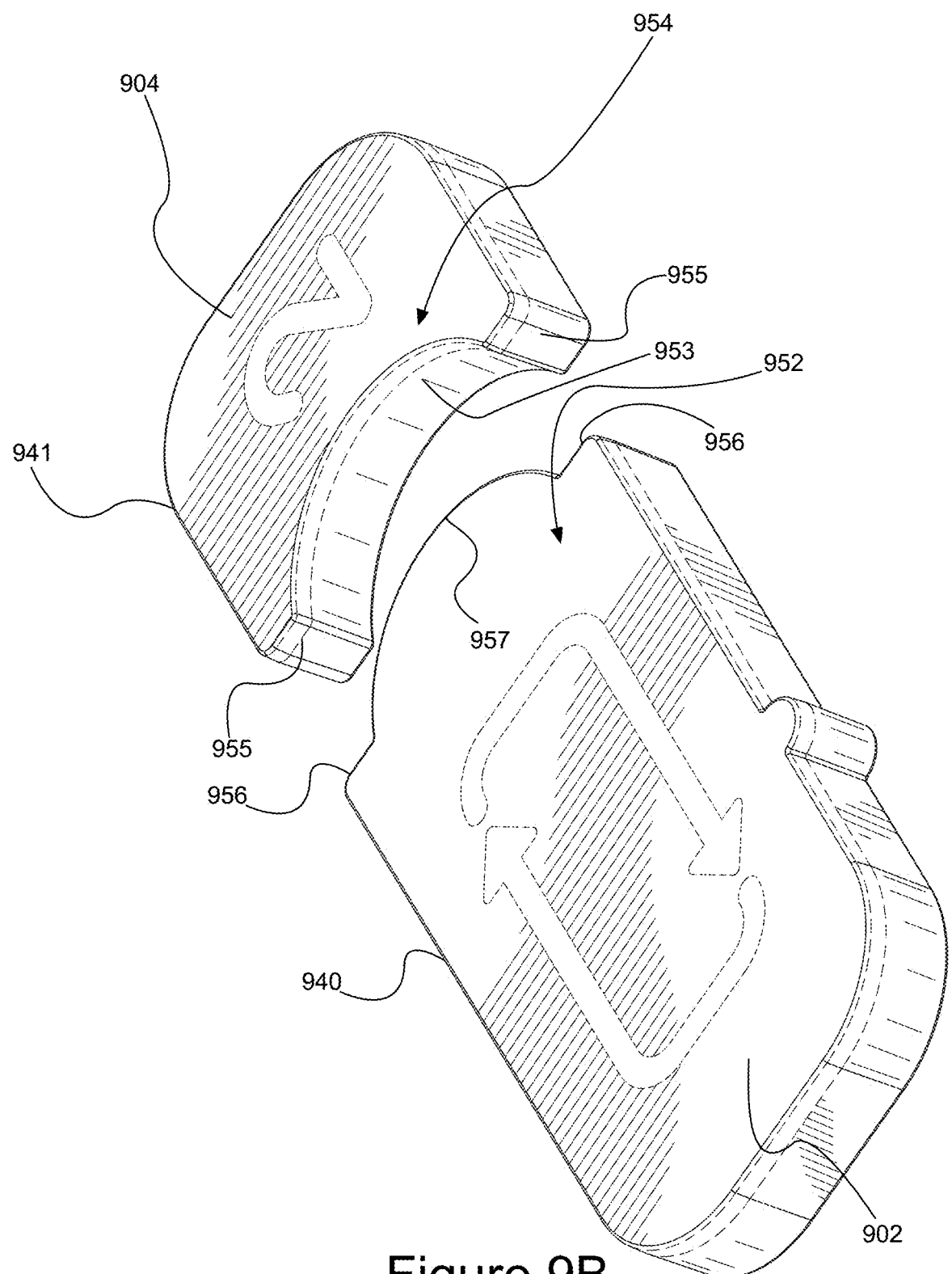
Figure 9C:
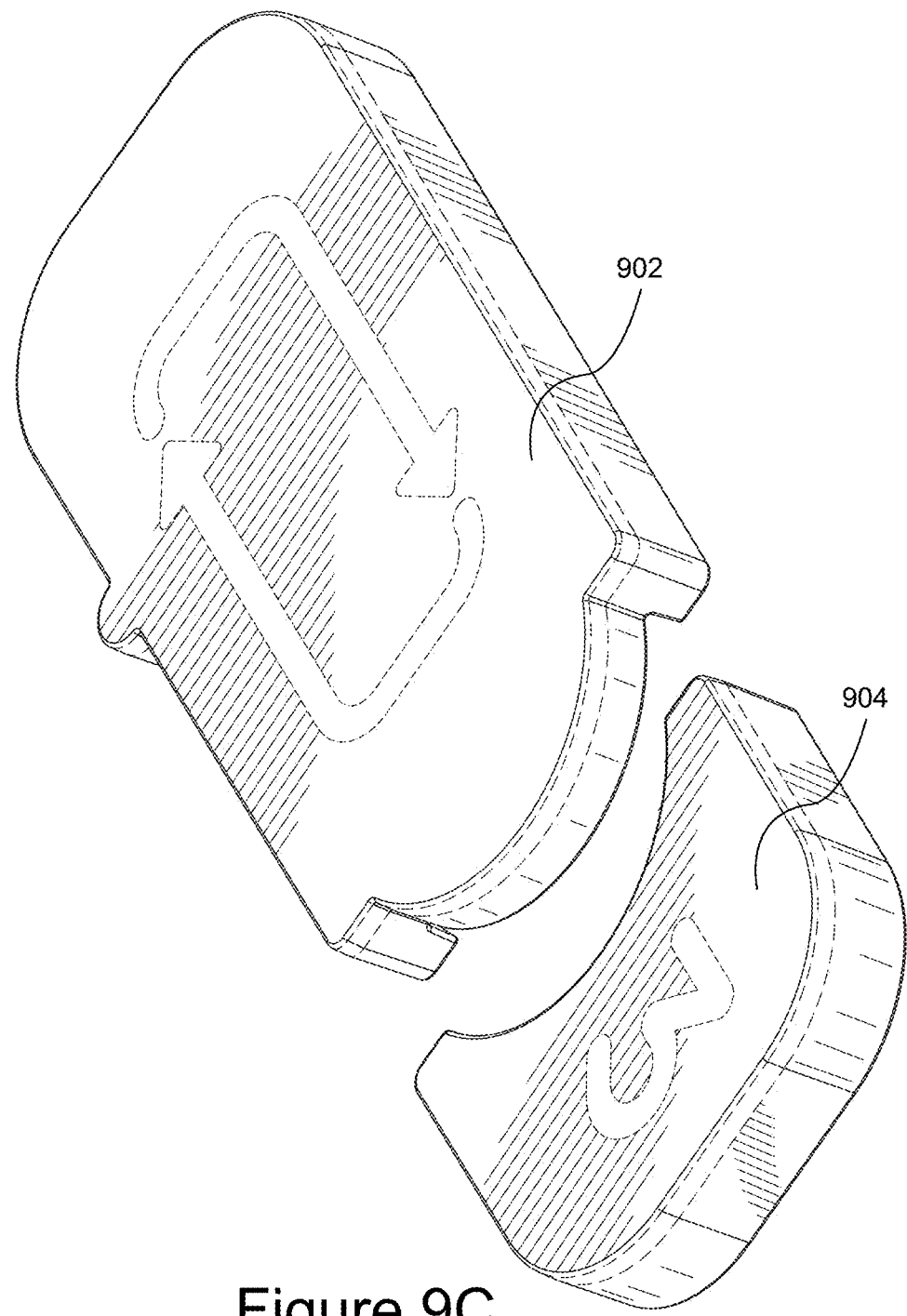

FIGS. 9B and 9C are perspective views of the programming tile 900 showing the first portion 940 and the second portion 941 of the programming tile 900 separated. In its separated form, the surfaces of the tile coupling portions 952 and 954 are revealed and visible. As shown, the tile coupling portion 952 may include side surfaces 956 and 957, and the tile coupling portion 954 include side surfaces 955 and 953.

In some embodiments, the tile coupling portion 952 and the tile coupling portion 954 may be shaped in a way that they can compatibly engage and become aligned. Any suitable mechanism for aligning the portions 940 and 941 of the programming tile 900 is contemplated.

Figure 9D:
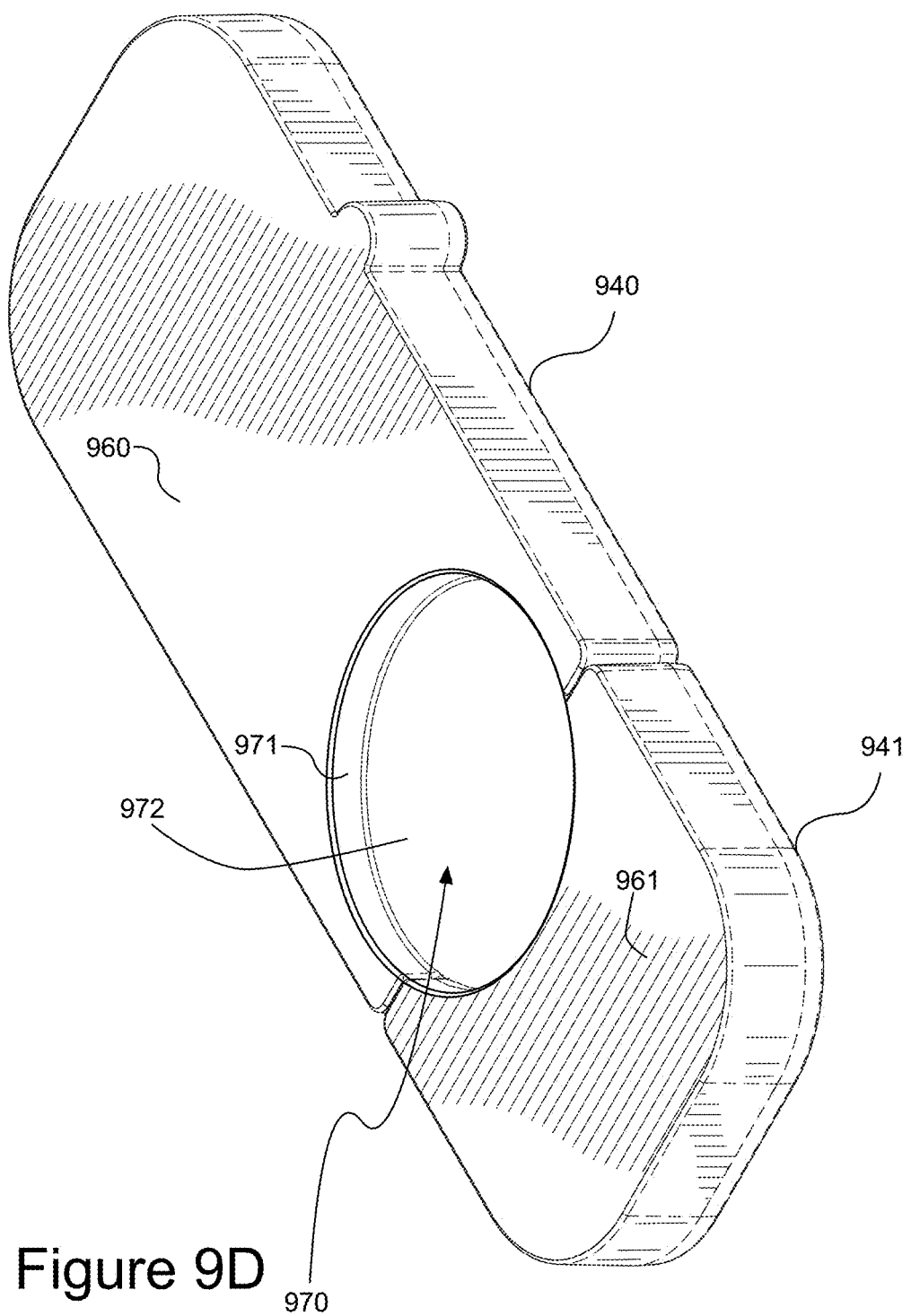
Figure 9E:
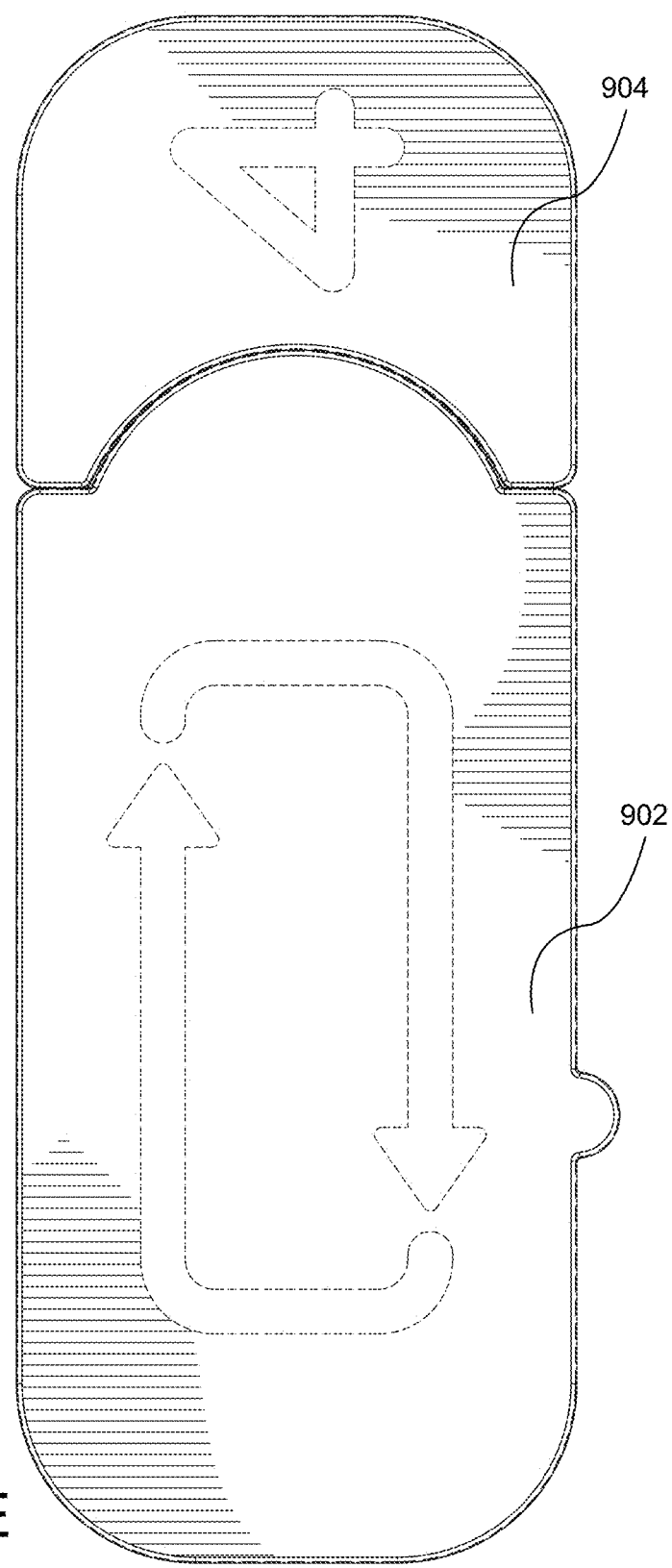

For instance, as depicted in FIGS. 9B and 9C, the tile coupling portion 952 may comprise a protruding portion and the tile coupling portion 954 may comprise a recessed portion. The protruding portion may include the surface 957, which radially extends outwardly from a center point aligned with the side surfaces 956. The recessed portion may include surface 953 that correspondingly radially recesses into the body of the second portion 941, thus extending inwardly from a center point aligned with the side surfaces 955. The side surfaces 956 and 955, and the curved surfaces 957 and 953, may be configured to mate with one another. For instance, the surfaces may abut against one another when coupled, as shown in FIGS. 9A, 9D, and 9E.

In some implementations, the second portion 941 may include one or more magnetic fasteners that are magnetically coupleable to one or more magnetic fasteners included in the first portion 940. As with the alignment mechanisms discussed herein with respect to the tangible physical object(s) 120, this advantageously allows the second portion 941 to be retained with the first portion 940 and resist inadvertent separation between the portions 940 and 941. For instance, the compatible magnetic fasteners may be embedded in the side surfaces 955, 956, 953, and/or 957, such that as the surfaces are sufficiently closely adjacently situated, magnetic fields of the magnetic fasteners may interact in the pieces may bond together (e.g., snap together in some cases).

In further embodiments, the second portion 941 and the first portion 940 may be detachably coupled using additional and/or alternative fasteners, such as engagement and receiving components having predetermined shapes that are configured to snap together, clip together, hook together, or otherwise coupled to one another in a removable fashion.

The detachable/re-attachable nature of the first and second portions 940 and 941 is advantageous as it allows the user to conveniently and easily switch out different tiles in order to change up the programming sequence there creating. For example, the user can easily switch out the second portion 942 change the counter of a loop command, as shown in FIGS. 9A, 9B, 9C, and 9D, which show quantifier regions 904 having different values (e.g., one, two, three, and four, etc.).

In some implementations, one or more sides of the programming tile 900 may include one or more components of the stacking mechanism, as described elsewhere herein. For example, a bottom side of the programming tile 900 may include a bottom surface collectively comprised of bottom surface 960 and bottom surface 961 of the first and second portions 940 and 941. The bottom surface may include a component 970 of the stacking mechanism that is configured to engage with one or more other compatible components, such that two or more tangible physical objects 120 can be stacked. For example, as shown, a recess 970 may be formed in the bottom surface. The recess may include an inner cavity sidewall 971 and a cavity end/bottom surface 972. The recess may be shaped to receive a compatibly shaped protrusion of another tangible physical object 120, as discussed elsewhere herein. While in this particular example, the stacking mechanism component is shown as a recess, it should be understood that other suitable options, such as those described with reference to the alignment mechanism, are applicable and encompassed hereby.

Figure 10A:
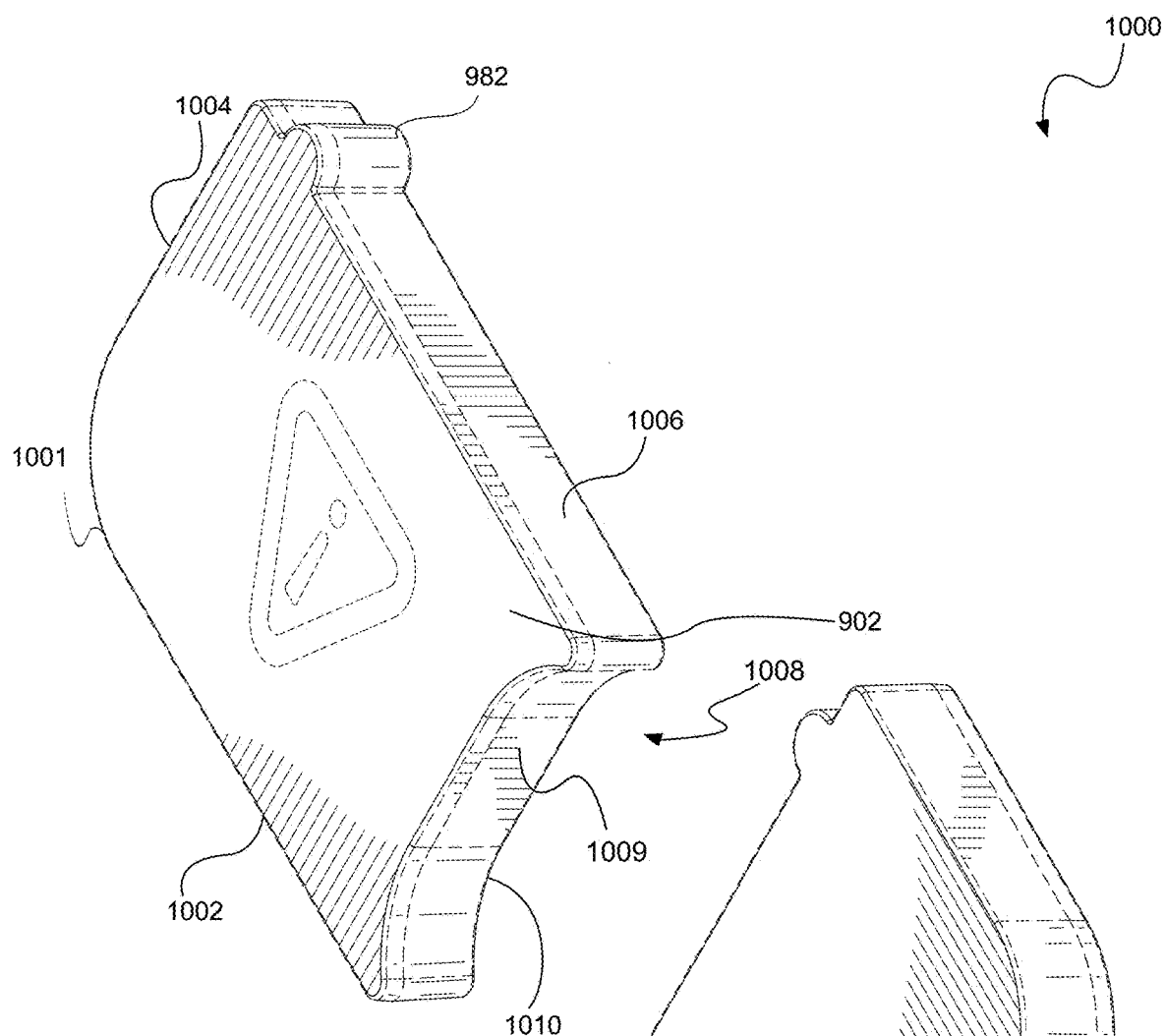
Figure 10B:
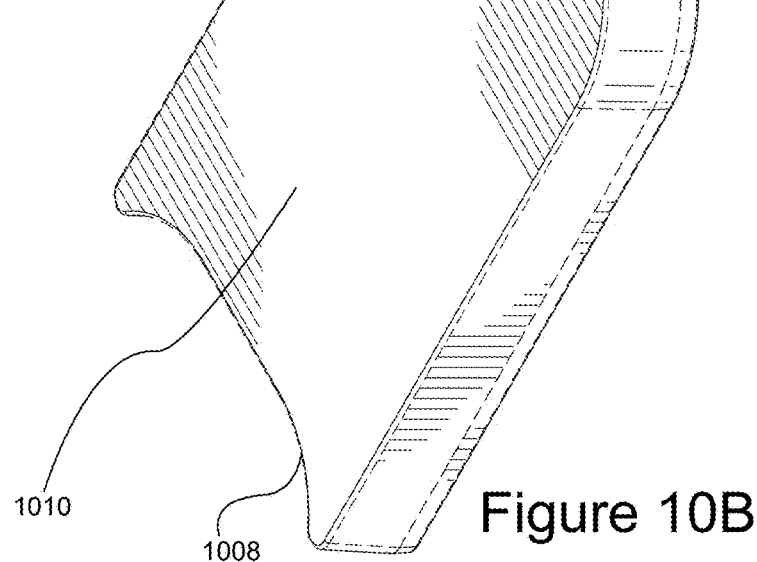

FIGS. 10A and 10B are perspective views of an example programming tile 1000. As shown, the programming tile 1000 may include a body having a front surface 1001, back surface 1010, I tile engaging side surface 1009, and alignment side surface 1006, an end surface 1004, and a side surface 1002. The front surface 1001 and back surface 1010 are connected via the side surfaces 1009, 1006, 1004, and 1002 in a similar manner to that described with reference to the programming tile 900, which will not be repeated here for the purpose of brevity. The programming tile 1000 may include a command region 902. In the depicted example, the command region 902 includes a visual indicator reflecting an if command, as discussed elsewhere herein, although other visual indicators are also possible and contemplated.

The programming tile 1000, as depicted, includes a tile coupling portion 1008. The tile coupling portion 1008 is configured to couple with one or more sides of another tangible physical object 120. In some implementations, coupling the programming tile 1000 to another tile allows the user to augment, enhance, add to, etc., an action of the other tile (e.g., based on the command regions 902 of the respective tiles), as discussed elsewhere herein.

In some implementations, the tile coupling portion 1008 may comprise a recessed surface 1009 that is configured to mate with a corresponding outer surface of an adjacent programming tile, such as surface 948 of the second portion 941 of the programming tile 900, the surface 1148 of the programming tile 1100 (e.g., see FIG. 11), and/or any other suitable tile surfaces of any other applicable tiles, etc.

Figure 11A:
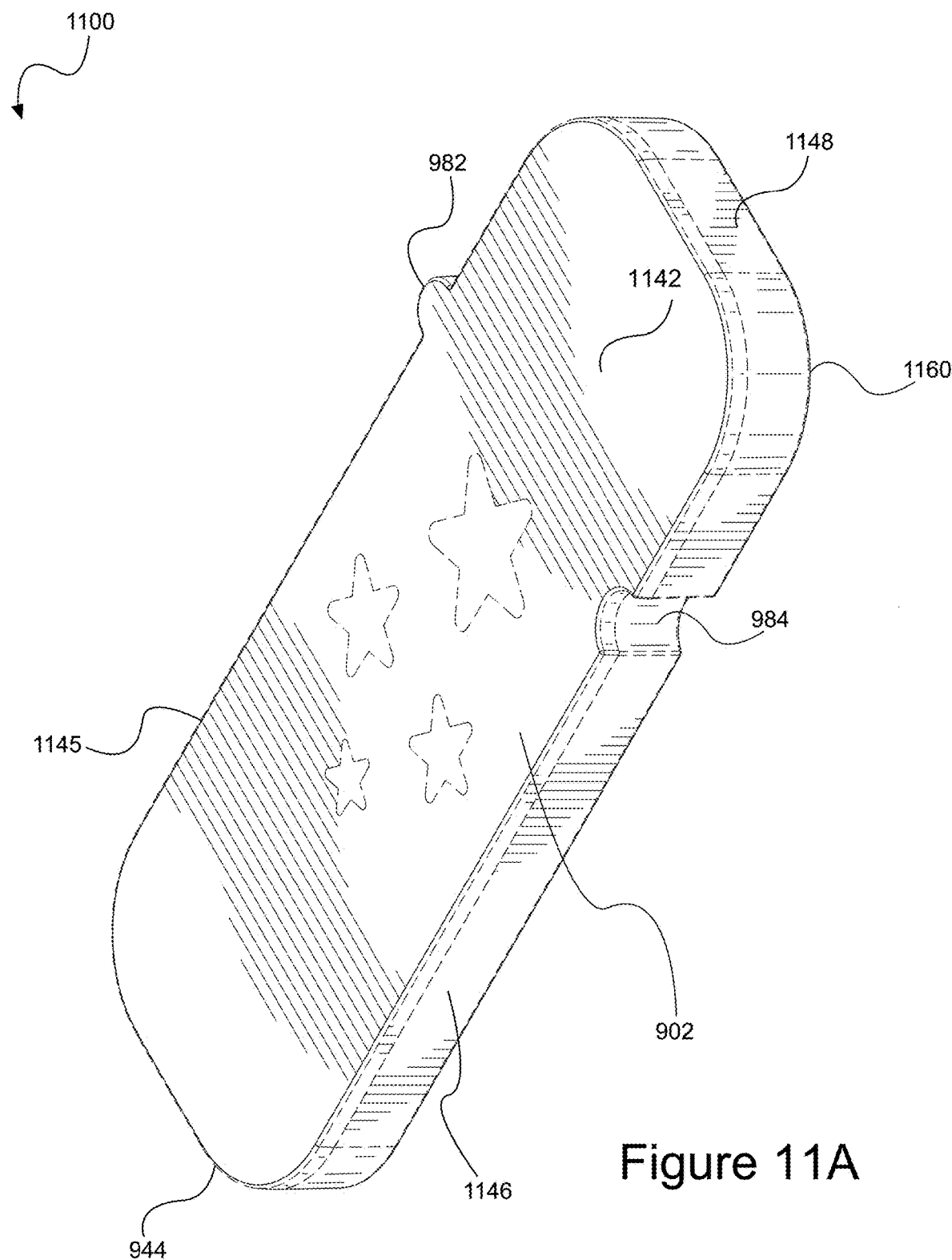
Figure 11B:
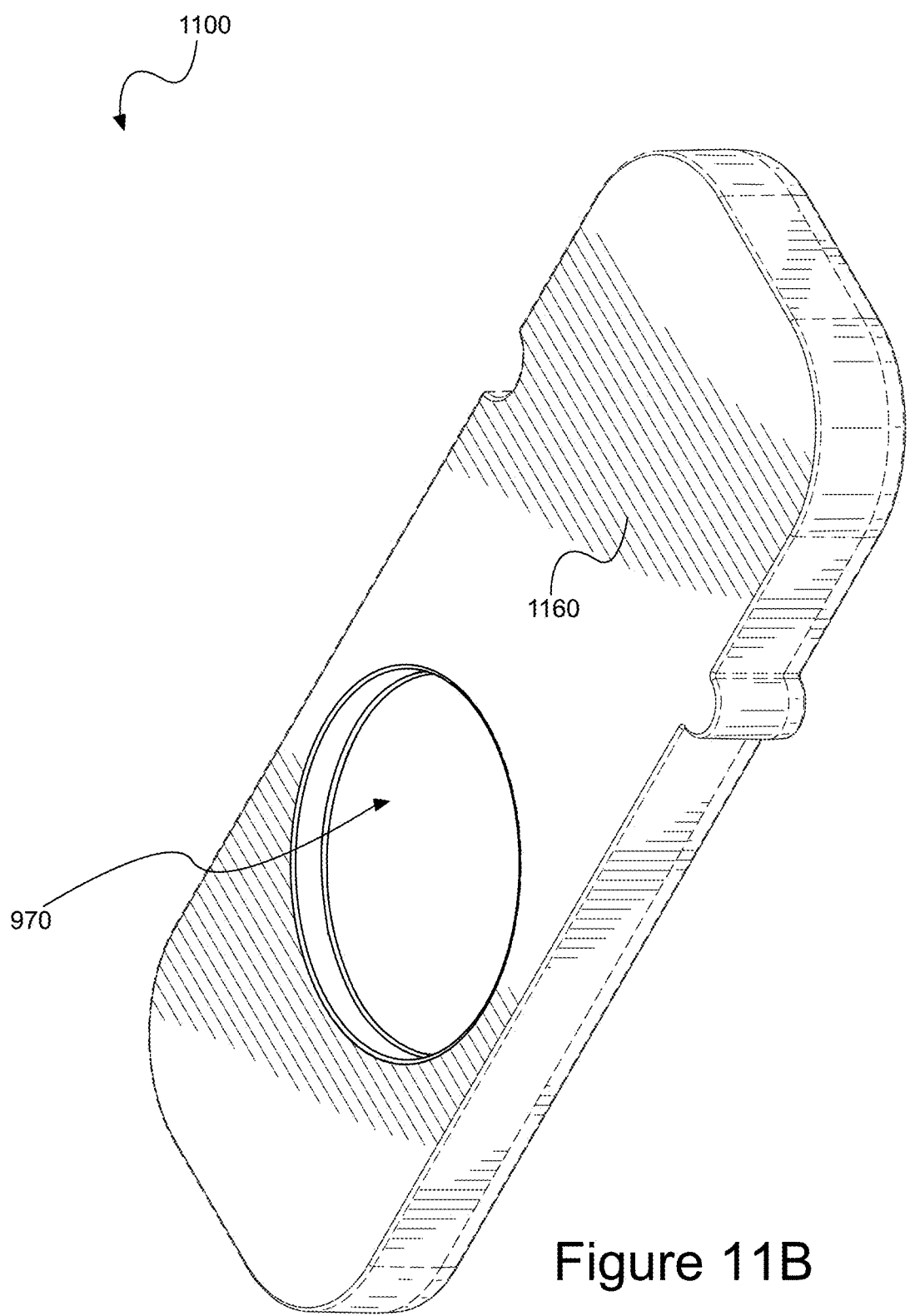

FIGS. 11A and 11B are perspective views of an example programming tile 1100. As depicted, the programming tile 1100 is comprised of a single tile, which includes a front surface 1142 having a command region 902, side surfaces 944, 1146, 1148, and 1145, and bottom surface 1160. The front surface 142 is connected to the bottom surface number 1160 via the side surfaces 944, 1146, 1148, and 1145, in a manner similar to that discussed with reference to programming tile 900, which will not be repeated here for the purpose of brevity. As shown, the surface 1146 includes an alignment component 984, and the surface 1145 includes the alignment component 982, as discussed elsewhere herein.

In FIG. 11B, a bottom side of the programming tile 1100 includes a component 970 of the stacking mechanism discussed above. In contrast to FIG. 9D, where the component 970 may extend across two or more discrete portions of the programming tile, and this non-limiting example, the stacking component 970 is included in a single portion of the programming tile, to illustrate the flexibility of the design. However, it should be understood that the stacking portion may be included in one or more regions of the programming tile. For example, the component 970 may comprise two or more receiving or engaging components (e.g., recesses or protrusions, other fastening components, etc.) configured to interact with two or more corresponding receiving or engaging components of the opposing surface of an adjacently situated programming, such as one on which the programming tile 1100 is being stacked.

Figure 12A:
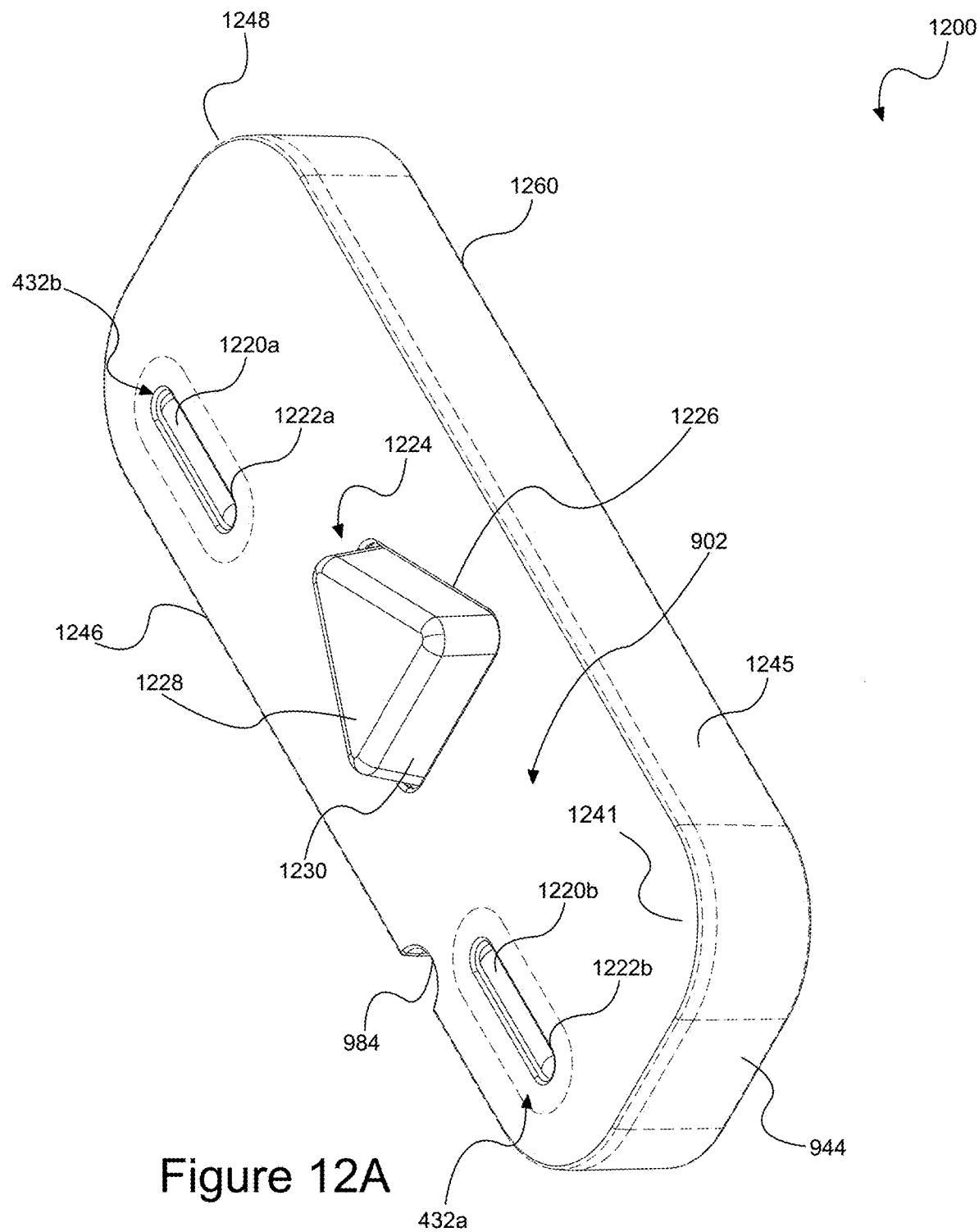
Figure 12B:
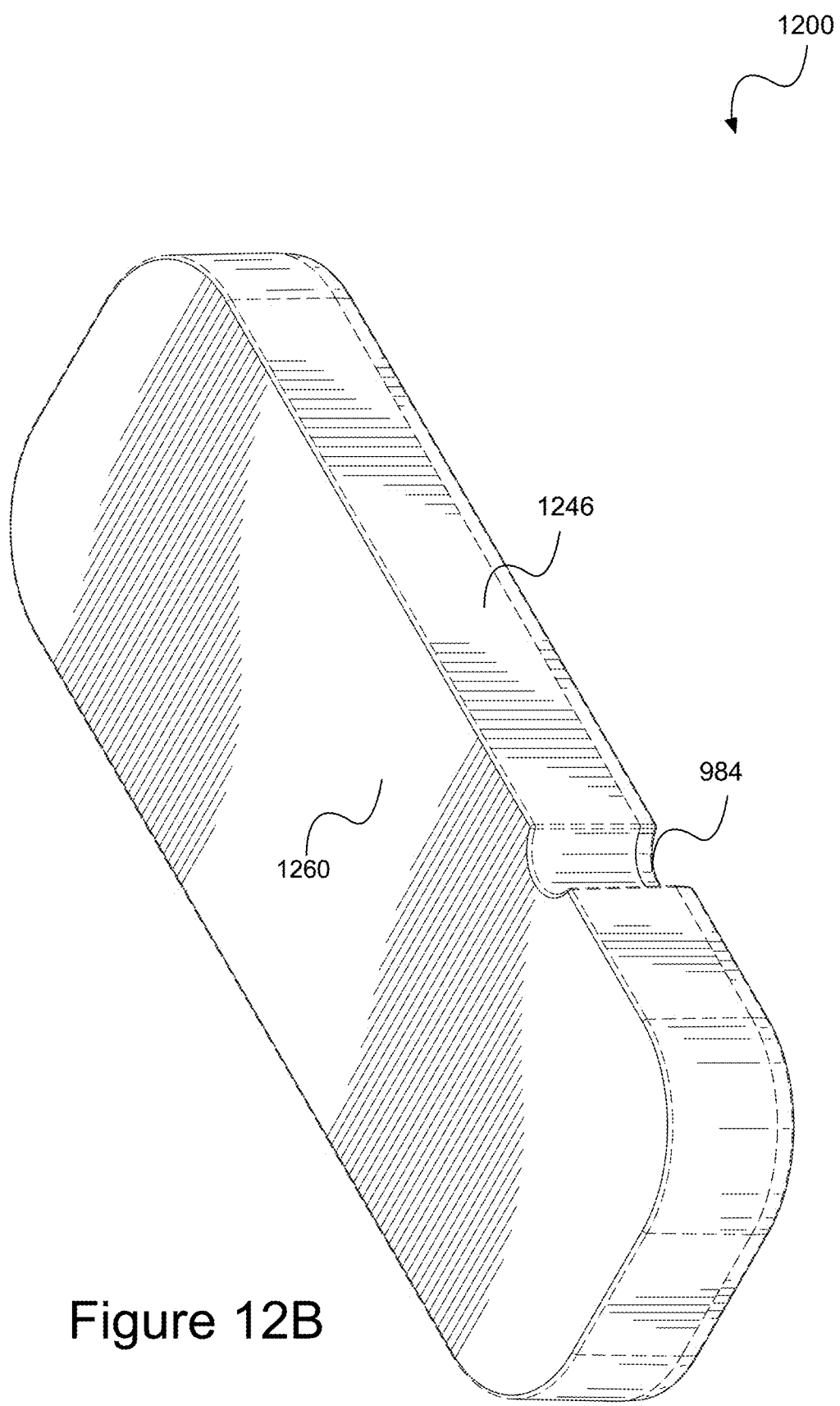

FIGS. 12A and 12B are perspective views of an example programming tile 1200. The programming tile 1200 may include a front surface 1241 including a command region 902, side surfaces 944, 1245, 1248, and 1246, and bottom surface 1260. The front surface 1241 may include one or more visual indicators 432 (e.g., 432a, 432b, etc.), that are mechanically linked to a user-interactable tangible button 1224, such that when a user presses the button 1224, the one or more visual indicators are triggered. Upon being triggered, the visual indicators 432 may change their physical appearance, the change of which may be detected by the system 100, as discussed elsewhere herein.

In some implementations, the button 1224 may be formed on the plate (e.g. not shown) within the body of the programming tile 1200, which may comprise a housing of a mechanical assembly that transmits the vertical movement of the button to the components comprising the visual indicators 432. For example, as shown, a visual indicator 432 may comprise an aperture 1222 (e.g., 1222a, 1222b, etc.) formed in the front surface 1241 of the programming tile 1200, and a block 1220 (e.g., 1220a, 1220b, etc.) that is situated within the aperture 1222, thus filling the aperture 1222. As the button 1224 is pressed (e.g., by a user pressing the top surface 1228 of the button 1224, which is coupled to the mechanical assembly via side(s) 1230 of the button) and recedes into the corresponding aperture 1226, formed in the front surface 1241, and through which the button extends, the mechanical assembly transmits the movement to the block 1220 and corresponding recedes the block away from the front surface such that the aperture appears empty.

The state of the aperture (e.g., filled, empty) may be detected by the system 100. Additionally or alternatively, the state of the button 1224 (e.g., pressed, semi-pressed, fully pressed), may similarly be detected by the system 100. Detection of such state changes may trigger execution of the program which is embodied by a collection of programming tiles including, in this case, the programming tile 1200.

FIGS. 13A-13H are various views of an example programming tile 1300. The programming tile 1300 includes a first portion 1340 and the second portion 941. The second portion 941 is discussed with reference to FIGS. 9A-9E, so a detailed description of the portion 941 will not be repeated here for the purposes of brevity. The first portion 1340 includes a front surface 1342, the side surface 944, the side surface 945, a side surface 1346, an incrementing portion 1310 having one or more side surfaces, and a bottom surface 1360. The front surface 1342 is connected to the back surface 1316 via the side surfaces 944, 945, 1346, and/or surface(s) of the incrementing portion 1310. The side surface 1346 includes the alignment component 984, and the side surface 945 includes the alignment component 982, as discussed elsewhere herein. The front surface 1342 includes a command region 902.

Figure 13A:
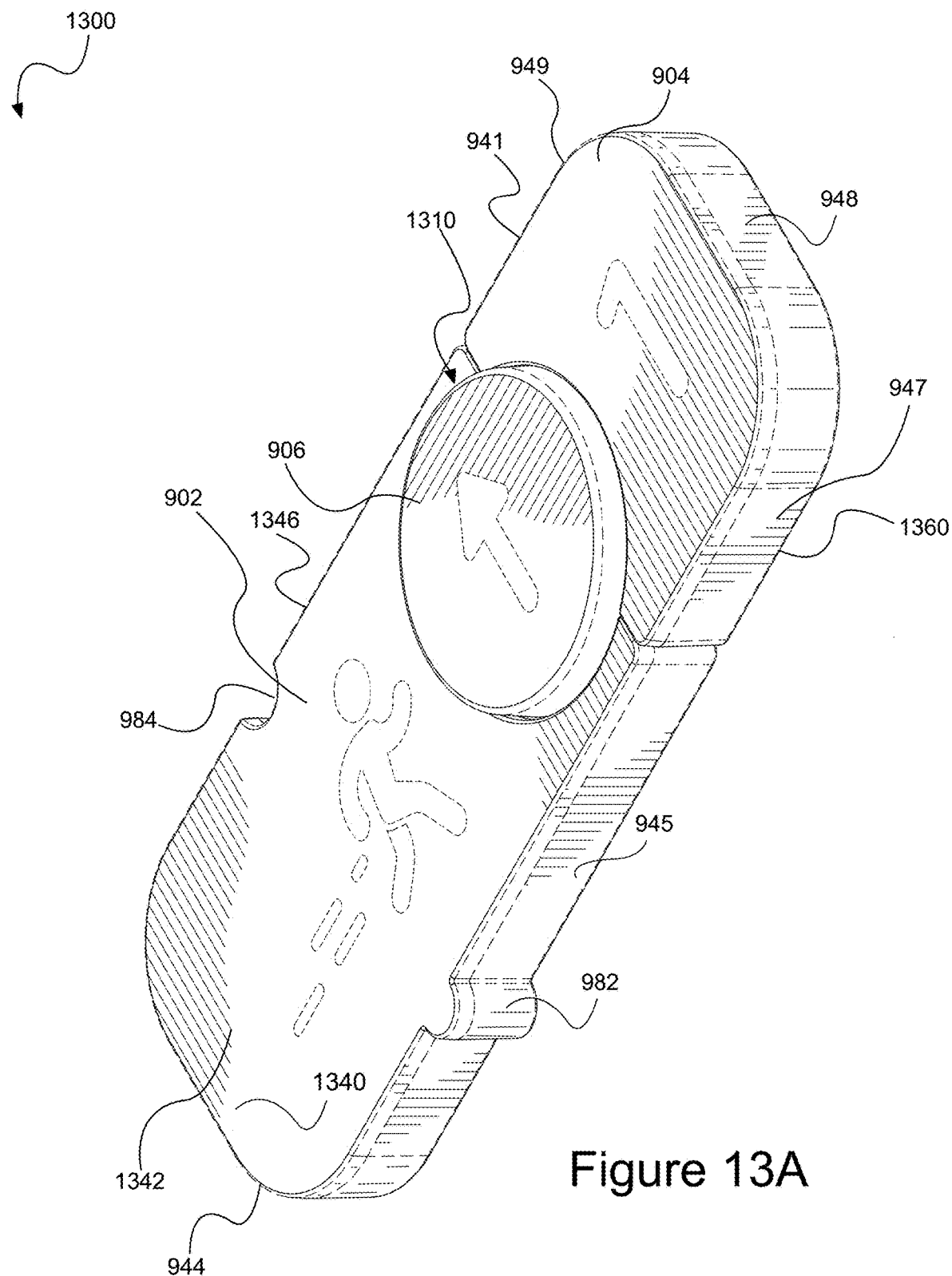
Figure 13B:
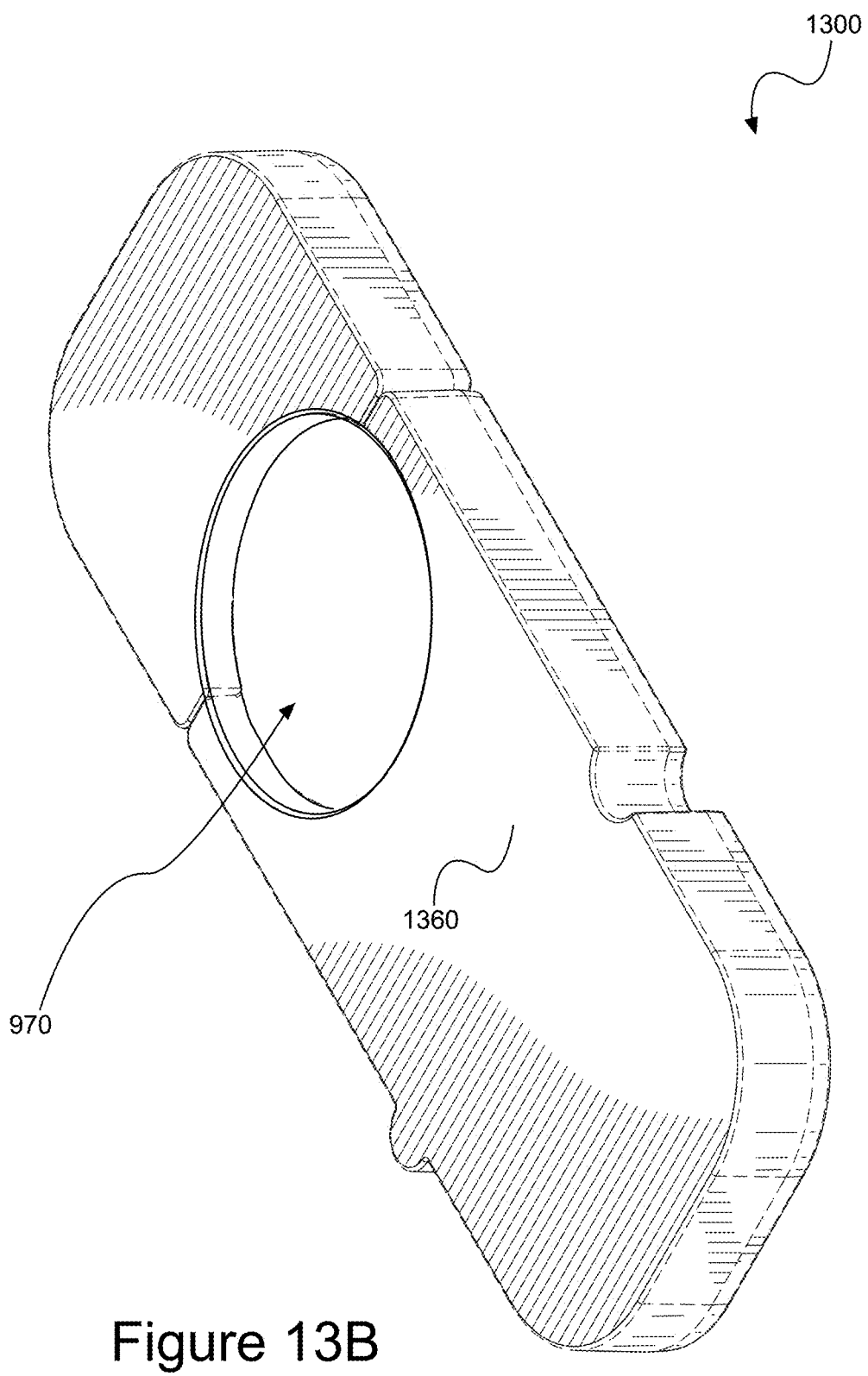
Figure 13C:
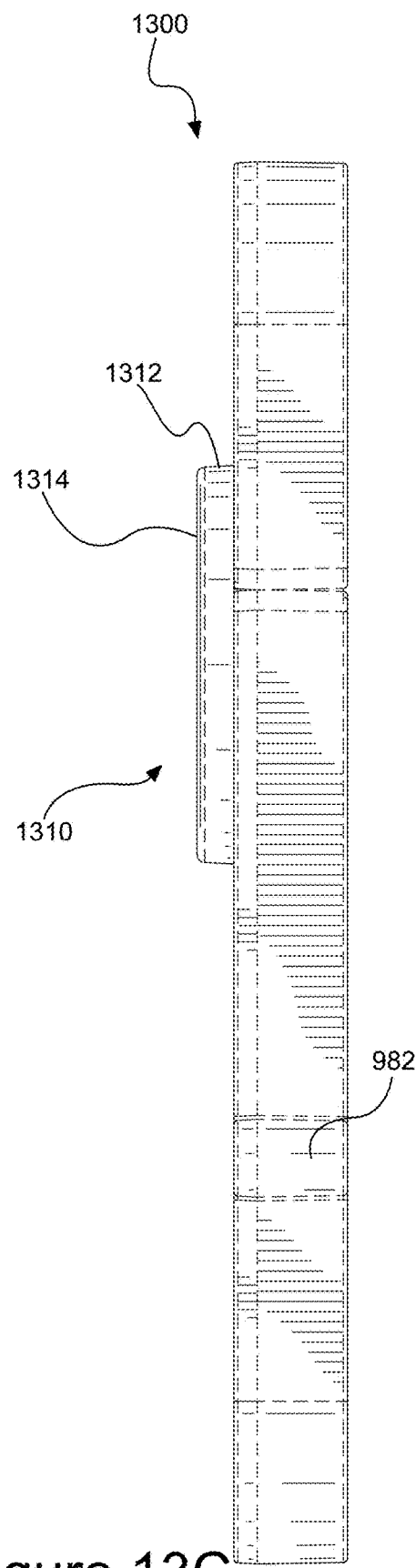
Figure 13D:
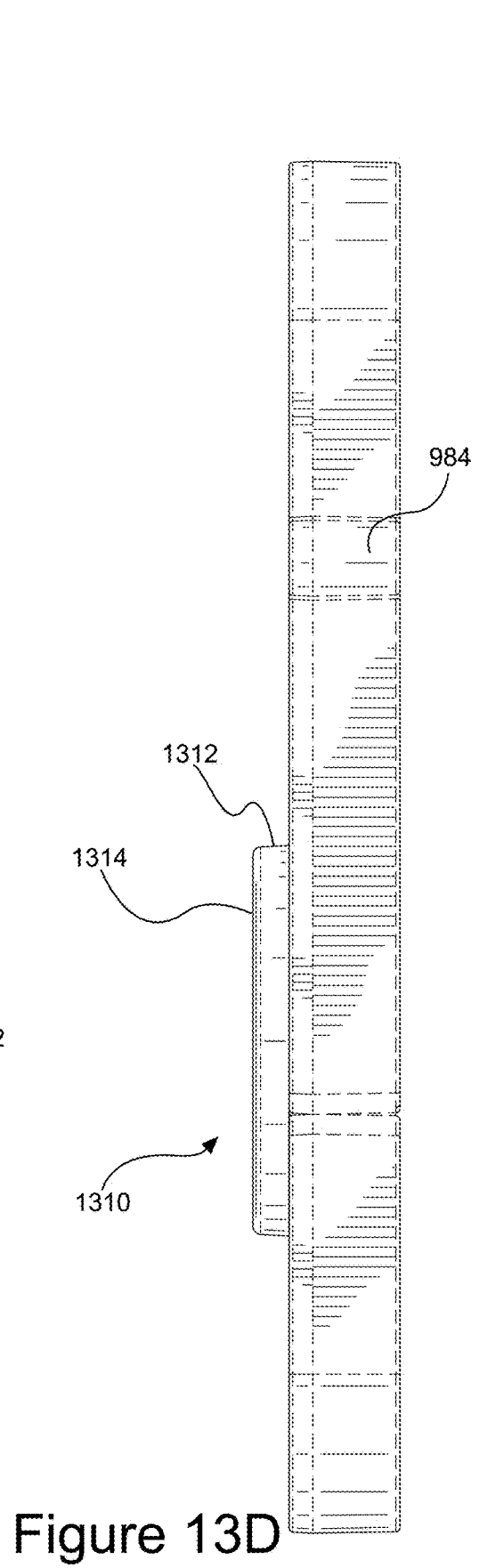

Similar to FIG. 9D, in FIG. 13D, the back surface 1360 of the programming tile 1300 may include a stacking component, such as component 970. FIGS. 13C and 13D are profile views of the programming tile 1300, showing the incrementing portion 1310. As shown, in the depicted implementation, the incrementing portion 1310 protrudes outwardly from the front surface 1342. For example, the incrementing portion 1310 includes one or more sides extending perpendicularly outwardly from the front surface 1342 to a top surface 1314 of the incrementing portion 1310. In some implementations, the incrementing portion 1310 comprises a dial that is turnable by the user to adjust a parameter (e.g., the parameter region 906 (e.g., directional region 406)) associated with the command of the command region 902, as discussed elsewhere herein. For example, as shown across FIGS. 13A, 13B, 13F, 13G, and 13H, the dial may be turned by the user to position the visual indicator (e.g., an arrow in this case) included on the top surface 1314 differently.

Figure 13E:
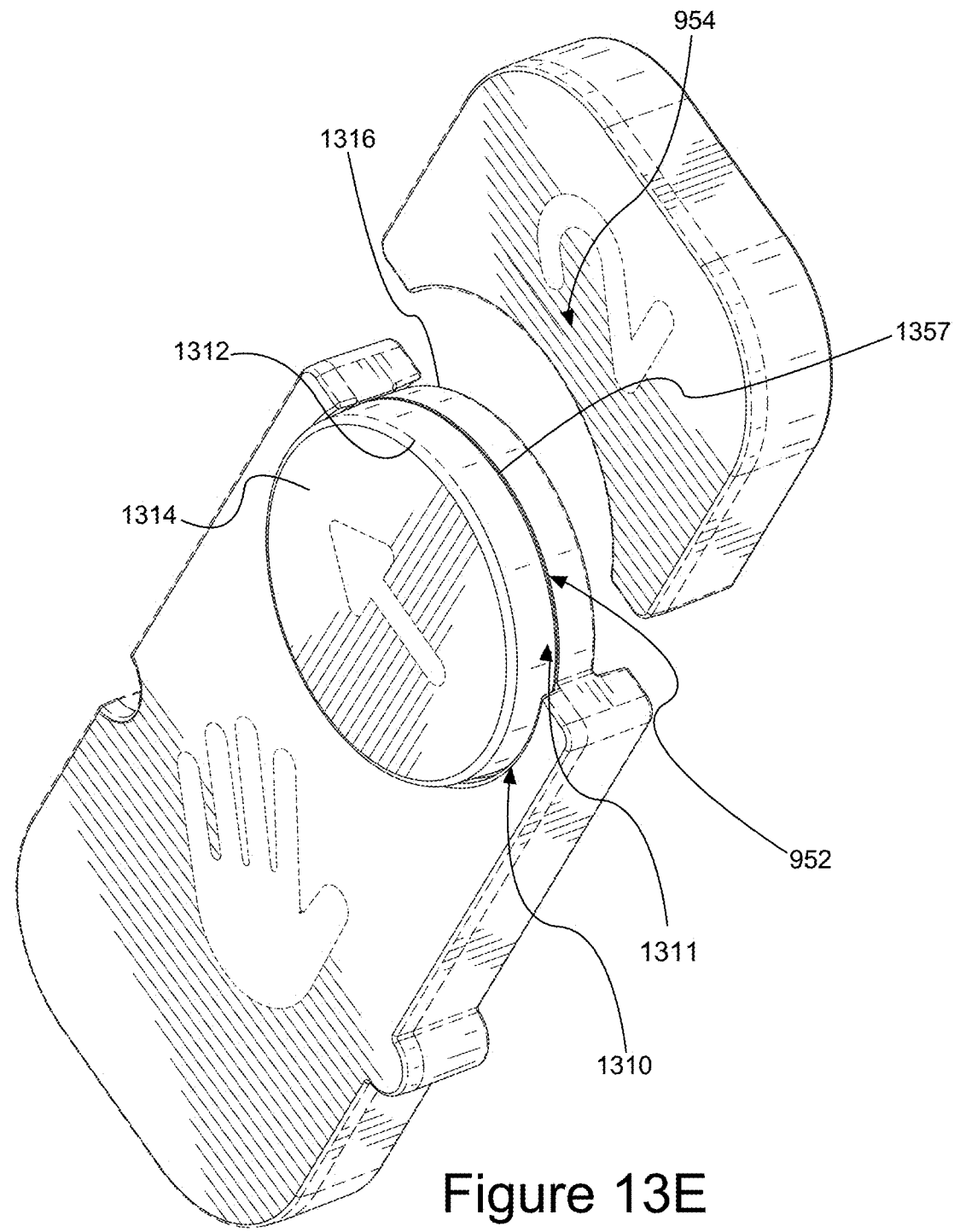
Figure 13F:
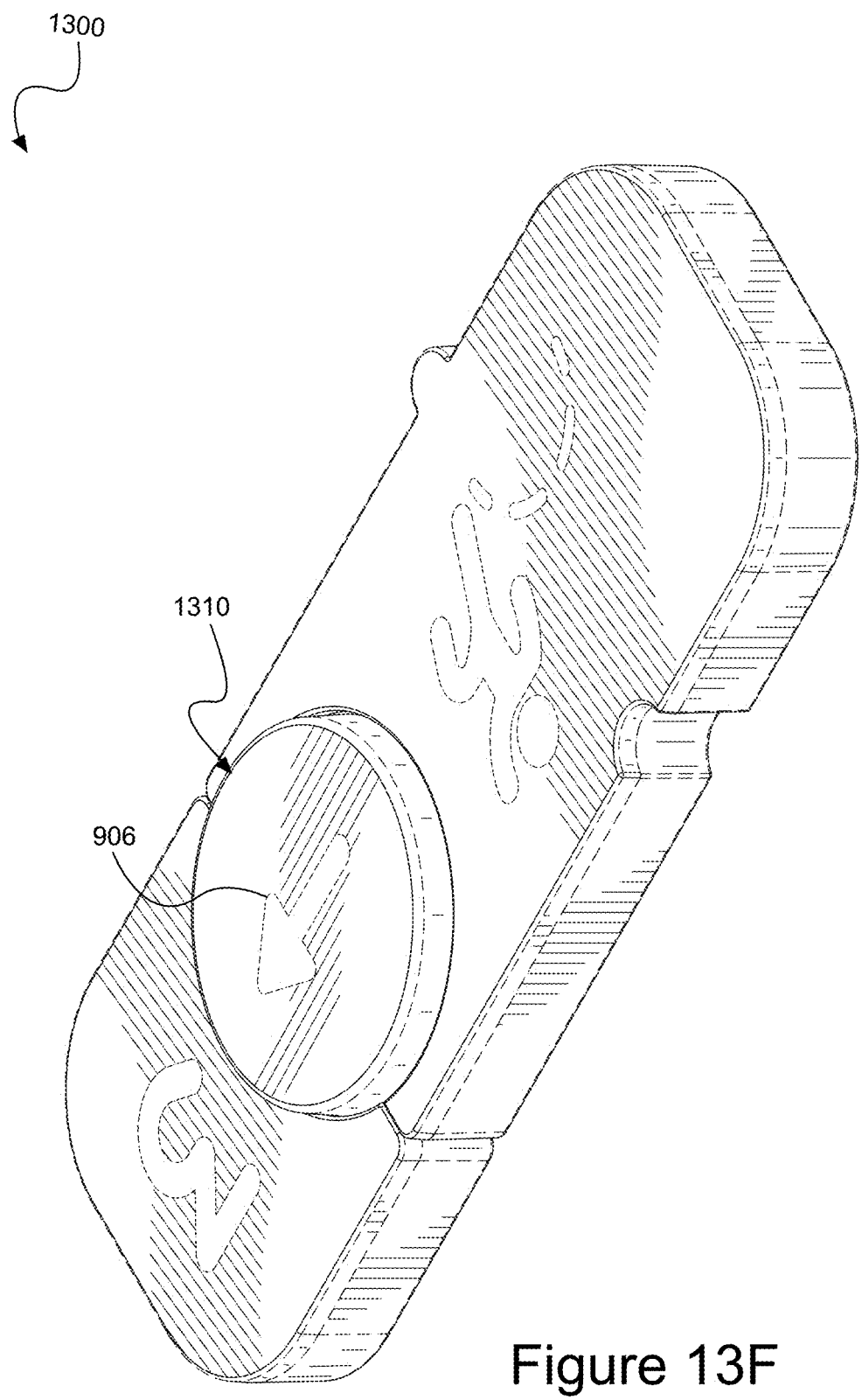
Figure 13G:
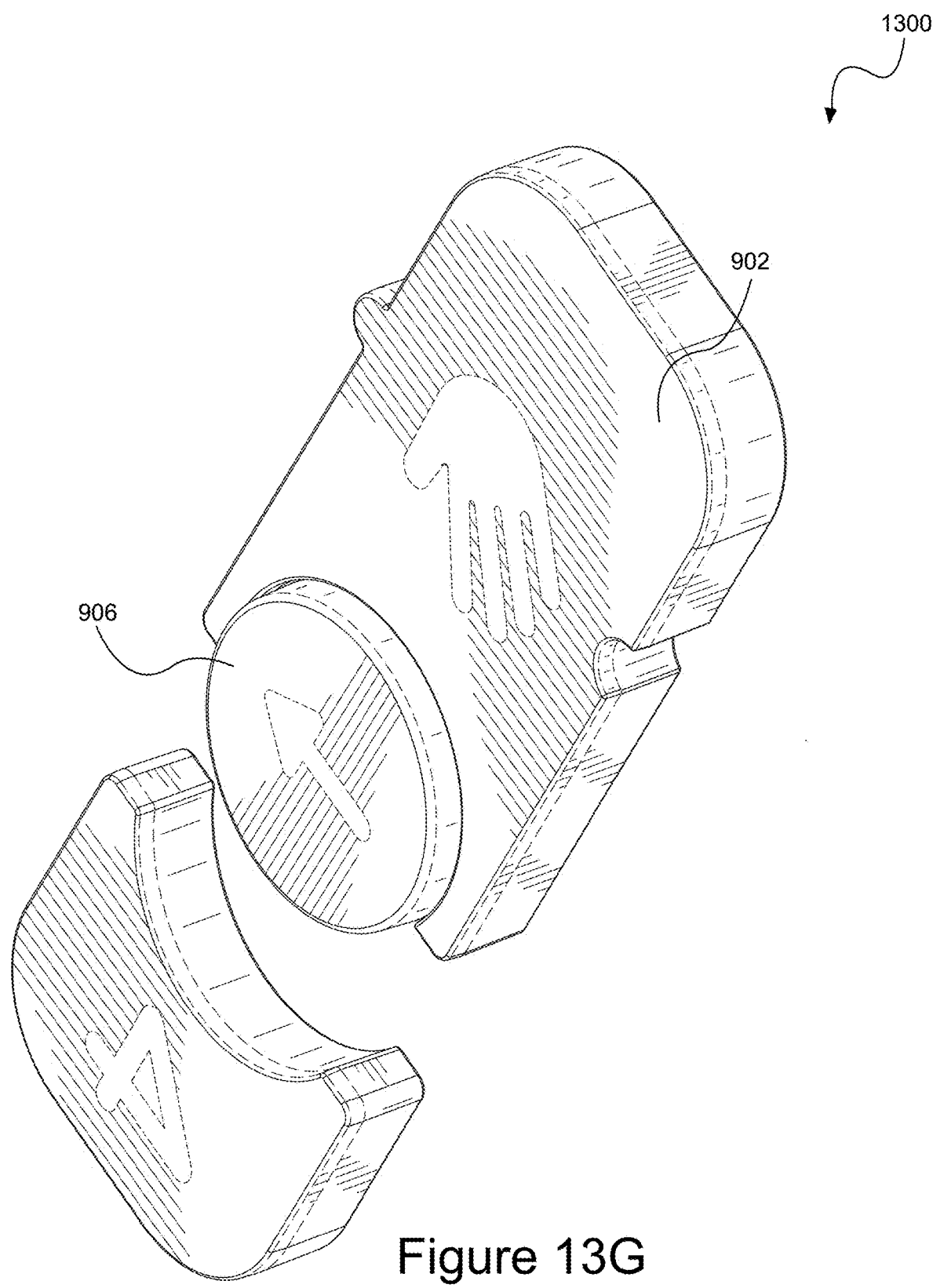
Figure 13H:
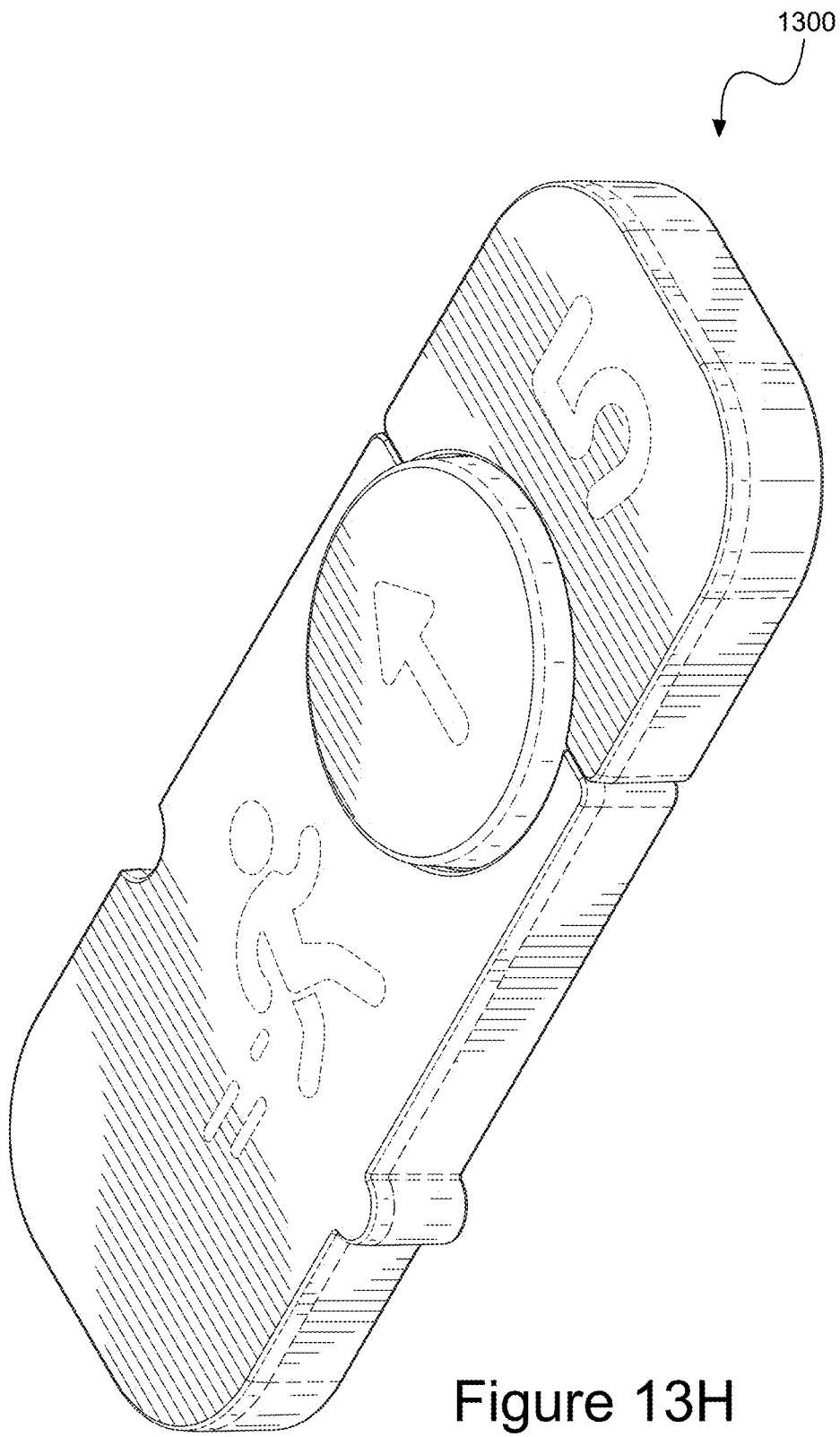

In FIG. 13E, unexploded be as shown where the second portion 941 is separated away from the first portion 1340, exposing the side view of the incrementing portion 1310. As shown, the incrementing portion 1310 may include a base portion 1316 which includes a recess in which the turnable portion 1311 of the incrementing portion 1310 is inserted and in which the turnable portion 1311 rotates. Described another way, the base portion 1316 may include a bowl like cavity into which the turnable portion 1311 is inserted. The cavity, and some implementations, may emulate a chase, and the turnable portion 1311 may rotate the ball bearings included along the perimeter of the chase, as one in the art would understand. In some implementations, the turnable portion 1311 may include snapping fasteners configured to snap to corresponding snapping fasteners included in the base portion 1316 to retain the turnable portion 1311 in place. An outwardly facing portion of the turnable portion 1311 and the base portion 1316 may comprise the tile coupling portion 952, such that the first portion 1340 may couple with other programming tile 1300 portions, such as the second portion 941, as discussed elsewhere herein.

This technology yields numerous advantages including, but not limited to, providing a low-cost alternative for developing a nearly limitless range of applications that blend both physical and digital mediums by reusing existing hardware (e.g., camera) and leveraging novel lightweight detection and recognition algorithms, having low implementation costs, being compatible with existing computing device hardware, operating in real-time to provide for a rich, real-time virtual experience, processing numerous (e.g., >15, >25, >35, etc.) physical interface object(s) 120 simultaneously without overwhelming the computing device, recognizing physical interface object(s) 120 with substantially perfect recall and precision (e.g., 99% and 99.5%, respectively), being capable of adapting to lighting changes and wear and imperfections in physical interface object(s) 120, providing a collaborative tangible experience between users in disparate locations, being intuitive to setup and use even for young users (e.g., 3+ years old), being natural and intuitive to use, and requiring few or no constraints on the types of physical interface object(s) 120 that can be processed.

It should be understood that the above-described example activities are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   detecting objects in image data;
   performing comparisons between each of the detected objects and a predefined set of object definitions;
   recognizing a first object from the detected objects as a visually quantified object based on the comparisons;
   processing a command region and a quantifier region from the visually quantified object;
   identifying a command region line segment from the command region of the visually quantified object;
   identifying a quantifier region line segment from the quantifier region of the visually quantified object;

identifying a first visual attribute of the command region line segment;
identifying a second visual attribute of the quantifier region line segment;
identifying a programming command based on the identified first visual attribute of the command region line segment of the visually quantified object;
identifying a quantifier based on the identified second visual attribute of the quantifier region line segment of the visually quantified object;
determining a first command corresponding to the visually quantified object based on both the programming command and the quantifier; and
executing, using a computer processor, the first command in a set of sequential commands corresponding to the detected objects.

2. The computer-implemented method of claim 1, further comprising:
displaying a virtual environment in a user interface, the virtual environment including a target virtual object; and
capturing the image data, which depicts a sequence of physical interface objects arranged in a physical environment, wherein detecting the objects in the image data includes detecting representations of the physical interface objects forming the sequence.

3. The computer-implemented method of claim 1, further comprising:
displaying a virtual environment in a user interface, the virtual environment including a target virtual object; and
visually manipulating the target virtual object in the virtual environment responsive to executing the first command.

4. The computer-implemented method of claim 1, wherein:
recognizing the first object as the visually quantified object includes performing blob detection to detect a directional region of the first object as including a directional indicator; and
processing the command region and the quantifier region includes dividing the object into the command region and the quantifier region based on the directional region.

5. The computer-implemented method of claim 4, wherein, the directional indicator is pointed one or more of up, down, left, and right.

6. The computer-implemented method of claim 1, wherein, the first visual attribute of the command region line segment includes a predetermined color or graphic, and the second visual attribute of the quantifier region line segment includes a number.

7. The computer-implemented method of claim 1, wherein executing the first command further comprises:
displaying a virtual environment in a user interface, the virtual environment including a target virtual object;
determining a path of the target virtual object through a portion of the virtual environment based on the first command; and
displaying a path projection of the path to a user.

8. The computer-implemented method of claim 1, wherein the command region includes an action region and a direction region and wherein identifying the programming command based on the visual attribute of the command region further comprises:
identifying an action command based on visual attributes of the action region; and
identifying a direction command based on visual attributes of the direction region.

9. The computer-implemented method of claim 1, further comprising:
recognizing a second object from the detected objects as a visually unquantified object based on the comparisons;
identifying an unquantified command based on a visual attribute of the visually unquantified object; and
executing, using the computer processor, the unquantified command of the visually unquantified object.

10. The computer-implemented method of claim 9, further comprising:
building the set of sequential commands corresponding to the detected objects; and
executing, using the computer processor, the set of sequential commands in an execution order that is visually represented by a sequential order of the detected objects in the image data.

11. The computer-implemented method of claim 10, wherein building the set of sequential commands includes:
generating one or more clusters of the detected objects based on relative positions and relative orientations of the detected objects; and
determining the execution order for the set of sequential commands based on the one or more clusters.

12. The computer-implemented method of claim 11, further comprising:
determining that a candidate object is missing from a candidate location in the one or more clusters based on the relative positions and the relative orientations of the detected objects; and
injecting, into the set of sequential commands, a command corresponding to the candidate object at a position corresponding to the candidate location.

13. The computer-implemented method of claim 12, wherein the candidate object is one of an end object, an event object, and an action object missing from the image data.

14. The computer-implemented method of claim 9, wherein identifying the unquantified command includes:
identifying the visually unquantified object as an end object for a sequence of the objects detected from the image data; and
determining a physical state of the end object from the image data, wherein executing the unquantified command includes determining to execute the unquantified command based on the physical state of the end object.

15. The computer-implemented method of claim 14, wherein the end object includes a physical object associated with the end object and the end object includes a user-pressable button that changes an aspect of the physical object from a first state to a second state in which the user-pressable button is in a pressed state that is visually perceptible, the image data depicts the end object in the second state, and determining the physical state of the end object includes using blob detection and machine learning to determine that the physical state of the end object is the pressed state.

16. The computer-implemented method of claim 14, wherein the end object has the physical state including one of a pressed state, an unpressed state, a semi-pressed state, and a rubbish state that is indeterminable.

17. A computer-implemented method comprising:
detecting an object from image data;
recognizing the object as a numerically quantified object based on a predetermined visual characteristic;

processing the recognized object into a command region and a quantifier region;
identifying a command region line segment from the command region of the numerically quantified object;
identifying a quantifier region line segment from the quantifier region of the numerically quantified object;
identifying a first visual attribute of the command region line segment;
identifying a second visual attribute of the quantifier region line segment;
identifying, based on the first visual attribute of the command region line segment of the recognized object, a programming command to manipulate a virtual object rendered for display in a virtual environment displayed on a display of a computing device;
identifying a quantifier based on the second visual attribute of the quantifier region line segment of the recognized object;
determining a first command corresponding to the recognized object based on both the programming command and the quantifier; and
executing, using a processor of the computing device, the first command to manipulate the virtual object.

18. The computer-implemented method of claim 17, wherein the programming command includes one of a jump command, a move command, and an action command.

19. The computer-implemented method of claim 18, wherein executing the first command further comprises:
repeating for an amount of the quantifier, an execution of one of the jump command, the move command, and the action command.

20. The computer-implemented method of claim 17, wherein executing the first command to manipulate the virtual object includes presenting the virtual object moving through the virtual environment based on the first command.

21. The computer-implemented method of claim 17, further comprising:
generating a new virtual object for presentation on the display of the computing device based on the first command.

22. A computer-implemented method comprising:
presenting a user interface including a virtual environment and a target object;
determining an initial state of the target object in the virtual environment of the user interface;
capturing an image of a physical activity surface;
processing the image to detect two or more physical interface objects in a specific orientation and line segments of the two or more physical interface objects;
identifying one or more visual attributes of the line segments of the two or more physical interface objects;
comparing the physical interface objects in the specific orientation to a predefined set of instructions;
determining a command represented by the physical interface objects in the specific orientation based on the comparison and the one or more visual attributes of the line segments;
determining, based on the command represented by the physical interface objects, a path through the virtual environment for the target object to follow in the virtual environment; and
displaying a path projection in the user interface along the path for presentation to a user.

23. A computer-implemented method comprising:
receiving, from a video capture device, a video stream that includes a physical activity scene of a physical activity surface proximate to a display device, and one or more physical interface objects placed on the physical activity scene and physically interactable with by a user;
processing, using one or more computing devices, the video stream to detect the one or more line segments of the physical interface objects included in the physical activity scene;
recognizing a first object of the physical interface objects as a visually quantified object based on the one or more line segments and a second object of the physical interface objects as a visually unquantified object based on the one or more line segments;
for the visually quantified object,
processing a command region and a quantifier region from the visually quantified object,
identifying one or more visual attributes of the one or more line segments
identifying a programming command based on the one or more visual attributes of the one or more line segments of the command region of the visually quantified object,
identifying a quantifier based on the one or more visual attributes of the one or more line segments of the quantifier region of the visually quantified object, and
determining a first command corresponding to the visually quantified object based on both the programming command and the quantifier;
for the visually unquantified object, identifying a second command based on a visual attribute of the visually unquantified object; and
executing, using the one or more computing devices, a set of commands including the first command and the second command to present virtual information on the display device.

24. A visual tangible programming system comprising:
a video capture device coupled for communication with a computing device, the video capture device being adapted to capture a video stream that includes a physical activity scene adjacent to the computing device;
a detector coupled to the computing device, the detector being adapted to detect within the video stream one or more line segments forming a sequence of physical interface objects in the physical activity scene;
a processor of the computing device, the processor being adapted to
compare the one or more line segments forming the sequence of physical interface objects to a predefined set of object definitions,
recognize a visually quantified object based on the comparison, the visually quantified object including a command region and a quantifier region,
identify a programming command based on a visual attribute of the command region of the visually quantified object,
identify a quantifier based on a visual attribute of the quantifier region of the visually quantified object,
determine a first command corresponding to the visually quantified object based on both the programming command and the quantifier; and
execute the first command; and
a display coupled to the computing device, the display being adapted to display an interface that includes a virtual scene and update the virtual scene based on the executed first command.

* * * * *